(12) United States Patent
Kondo et al.

(10) Patent No.: US 6,346,063 B1
(45) Date of Patent: Feb. 12, 2002

(54) VEHICLE TRANSMISSION SHIFT CONTROL FOR ENGAGEMENT OF FRICTIONAL COUPLING DEVICE SO AS TO FIRST RAISE TRANSMISSION INPUT SPEED ABOVE SYNCHRONIZING SPEED

(75) Inventors: Masami Kondo, Toyota; Yasunari Nakamura, Nagoya, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 11 days.

(21) Appl. No.: 09/648,371

(22) Filed: Aug. 25, 2000

(30) Foreign Application Priority Data

Aug. 27, 1999 (JP) .............................. 11-241789

(51) Int. Cl.[7] ........................ F16H 61/04; F16H 61/06; F16H 61/08
(52) U.S. Cl. ........................ 477/143; 477/144; 477/148; 477/175
(58) Field of Search ............................... 477/143, 144, 477/174, 175, 180

(56) References Cited

U.S. PATENT DOCUMENTS 5,647,819 A * 7/1997 Fujita et al. ................. 477/140
5,961,421 A * 10/1999 Hoshiya et al. ............. 477/140
6,019,699 A * 2/2000 Hoshiya et al. ............... 477/20
6,155,948 A * 12/2000 Gierer ........................ 475/123

FOREIGN PATENT DOCUMENTS

| EP | 482690 | * 3/1995 |
|----|--------|----------|
| JP | 5-312261 | 11/1993 |

* cited by examiner

Primary Examiner—Sherry Estremsky
Assistant Examiner—Tisha D. Lewis
(74) Attorney, Agent, or Firm—Oblon, Spivak, McClelland, Maier & Neustadt, P.C.

(57) ABSTRACT

An apparatus for controlling an automatic transmission of an automotive vehicle, which is shifted to a selected one of operating positions by an engaging action of a frictional coupling device, wherein an overshoot engagement control device is provided to shift the automatic transmission to the selected one operating position such that a shifting action of the automatic transmission is initiated while an input speed of the automatic transmission is lower than a synchronizing speed of the selected operating position. The overshoot engagement control device is arranged to control an engaging force of the frictional coupling device such that the input speed is first raised above the synchronizing speed and is then lowered down toward the synchronizing speed.

10 Claims, 26 Drawing Sheets

FIG. 2

|     | C0 | C1 | C2 | B0 | B1 | B2 | B3 | B4 | F0 | F1 | F2 |
|-----|----|----|----|----|----|----|----|----|----|----|----|
| N   |    | ○  |    |    |    |    |    |    |    |    |    |
| Rev |    |    | ○  | ○  |    |    |    | ○  |    |    |    |
| 1st | ○  | ○  |    |    |    |    |    | ●  | ○  |    | ○  |
| 2nd | ●  | ○  |    |    |    | ○  |    |    | ○  |    |    |
| 3rd | ○  | ○  |    |    | ●  | ○  |    |    | ○  | ○  |    |
| 4th | ○  | ○  | ○  |    |    | △  |    |    | ○  |    |    |
| 5th |    | ○  | ○  | ○  |    | △  |    |    |    |    |    |

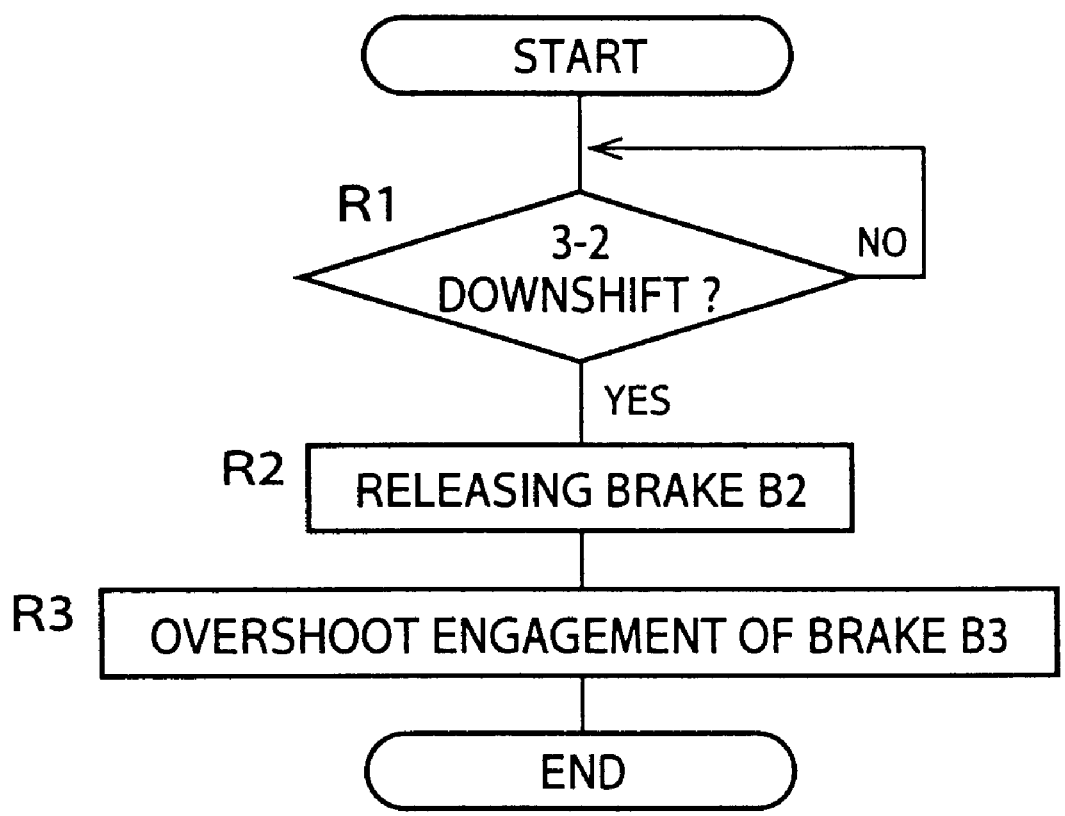

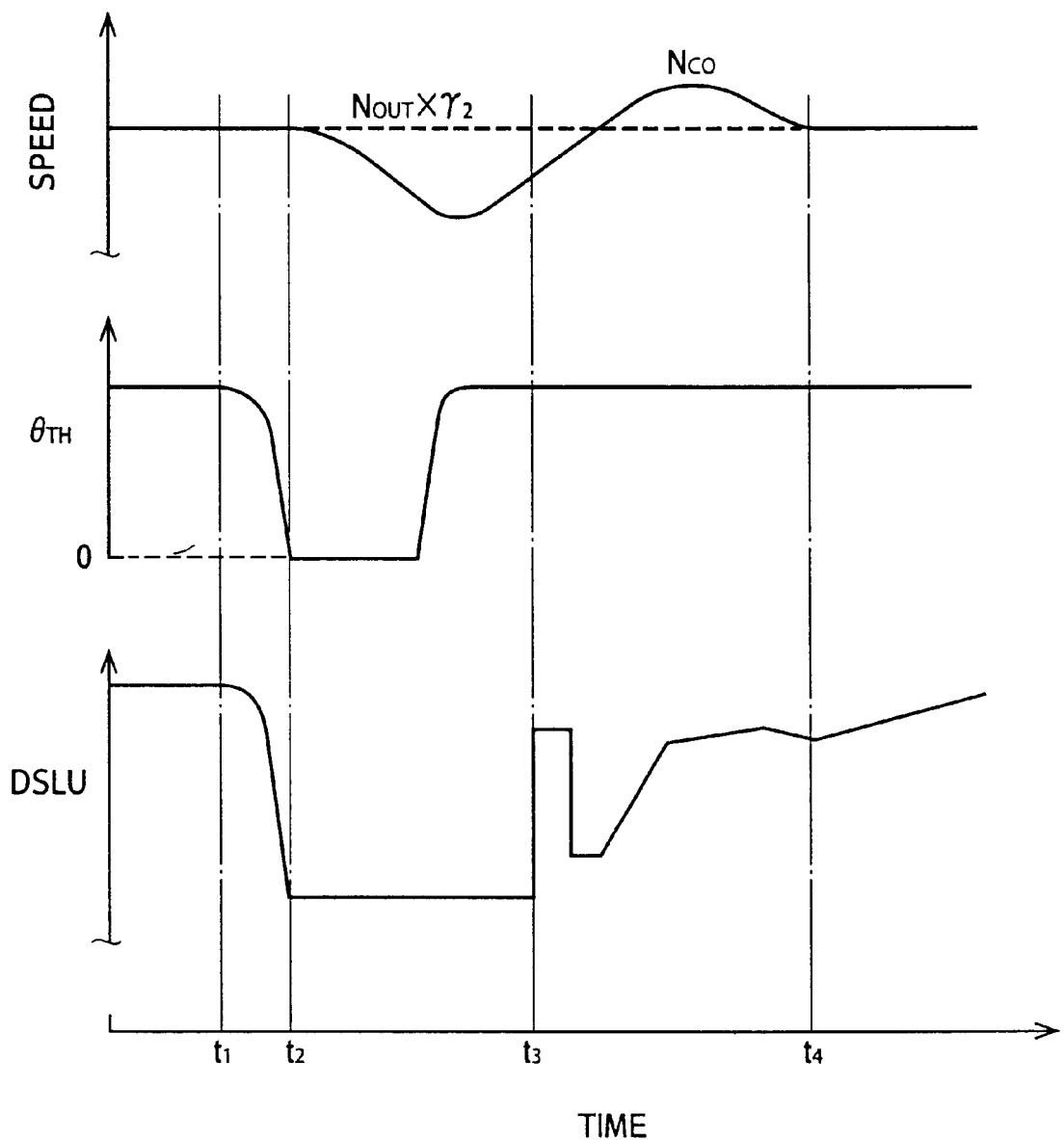

VEHICLE TRANSMISSION SHIFT CONTROL FOR ENGAGEMENT OF FRICTIONAL COUPLING DEVICE SO AS TO FIRST RAISE TRANSMISSION INPUT SPEED ABOVE SYNCHRONIZING SPEED

This application is based on Japanese Patent Application No. 11-241789 filed Aug. 27, 1999, the content of which is incorporated hereinto by reference.

BACKGROUND OF THE INVENTION

1. Field of the Invention

The present invention relates in general to a control apparatus for an automatic transmission of an automotive vehicle, and more particularly to a downshift of the automatic transmission which is initiated when the input speed of the transmission is lower than the synchronizing speed of an operating position to which the transmission is shifted down.

2. Discussion of the Related Art

There is widely known a power transmitting system for an automotive vehicle, which includes (a) an automatic transmission which is shifted to a selected one of a plurality of operating positions by engaging and releasing actions of a plurality of frictional coupling devices by respective hydraulic cylinders, and (b) a hydraulic control device for supplying a pressurized fluid to one of the hydraulic cylinders to effect an engaging action of a corresponding one of the frictional coupling device, the hydraulic control device including a pressure regulating device for controlling the pressure of the pressurized fluid applied to the above-indicated one hydraulic cylinder. JP-A-5-312261 discloses an example of such a power transmitting system, which is adapted to shift down the automatic transmission from a high-gear position to a low-gear position by releasing a frictional coupling device which has been engaged to establish the high-gear position, while at the same time engaging a frictional coupling device for establishing the low-gear position, that is, adapted to effect a so-called "clutch-to-clutch shifting action" wherein the hydraulic pressure of the frictional coupling device which has been engaged to establish the high-gear position is feedback-controlled such that the input speed of the automatic transmission changes at a predetermined rate while the hydraulic pressure of the frictional coupling device for establishing the low-gear position is held at a standby level, and such that the frictional coupling device for the high-gear position is fully released while the frictional coupling device for the low-gear position is fully engaged, after the input speed has substantially reached the synchronizing speed of the low-gear position.

In the conventional clutch-to-clutch shifting action described above, the hydraulic pressures of the two frictional coupling devices must be concurrently controlled, requiring a difficult control of the hydraulic control device. Where a downshift command to shift down the automatic transmission to the low-gear position is generated a comparatively short time after the generation of an upshift command to shift up the automatic transmission to the high-gear position, the clutch-to-clutch downshift cannot be achieved in an adequate manner unless the piston of the hydraulic cylinder (piston of an accumulator communicating with the hydraulic cylinder, if the accumulator is provided) has already reached the stroke end on the engaging side. In this case, therefore, the downshift to the low-gear position must be initiated only after the high-gear position has been once established. This arrangement requires a relatively long time to complete the downshift of the automatic transmission.

SUMMARY OF THE INVENTION

It is accordingly an object of the present invention to provide a control apparatus for an automatic transmission of an automotive vehicle, which is adapted to initiate a downshift of the automatic transmission from a high-gear position to a low-gear position while the input speed of the automatic transmission is lower than the synchronizing speed of the low-gear position, and which permits the downshift to be smoothly effected, by controlling an engaging action of only a frictional coupling device for establishing the low-gear position.

The above object may be achieved according to the principle of the present invention, which provides an apparatus for controlling an automatic transmission of an automotive vehicle, which is shifted to a selected one of a plurality of operating positions by an engaging action of a frictional coupling device, the apparatus comprising an overshoot engagement control device which is operated to shift the automatic transmission to the selected one operating position such that a shifting action of the automatic transmission is initiated while an input speed of the automatic transmission is lower than a synchronizing speed of the selected one operating position. The overshoot engagement control device controls an engaging force of the frictional coupling device such that the input speed is first raised above the synchronizing speed and is then lowered down toward the synchronizing speed.

In the vehicle transmission control apparatus of the present invention constructed as described above, the shifting action of the automatic transmission to a selected one of the operating positions is initiated while the input speed of the automatic transmission is lower than the synchronizing speed of the selected operating position. To shift the automatic transmission to the selected operating position, the engaging force of the frictional coupling device is controlled such that the input speed is first raised above the synchronizing speed and is then lowered down at a low rate toward the synchronizing speed. In this control arrangement, the engaging force of the frictional coupling device while the input shaft speed is higher than the synchronizing speed can be controlled in a manner similar to that used for controlling the frictional coupling device to shift up the automatic transmission to the selected operating position.

Thus, the automatic transmission can be shifted down to the selected operating position by controlling the engaging action of the single frictional coupling device, so that when the automatic transmission is commanded to be shifted down to the selected operating position a comparatively short time after the automatic transmission was commanded to be shifted up to the operating position one step higher than the selected operating position, the automatic transmission can be immediately shifted down to the selected operating position, without once establishing the higher operating position.

The automatic transmission to which the control apparatus of the present invention is applicable may include a plurality of planetary gear sets, and a plurality of hydraulically operated frictional coupling devices such as clutches and brakes for connecting rotary elements of the planetary gear sets to each other or fixing those rotary elements to the housing of the automatic transmission. In this case, the selected one of the operating positions of the automatic transmission which have respective different speed ratios is established by engaging and releasing actions of the appropriate frictional coupling devices. The automatic transmission may be automatically shifted down or up in response to a shifting command which is generated on the basis of the vehicle running speed and the operating amount of the accelerator pedal. Alternatively, the automatic transmission is commanded to be shifted in response to an operation of a shift lever or switch by the vehicle operator.

The automotive vehicle equipped with the present transmission control apparatus may use a drive power source selected from among various drive power sources such as an engine operated by combustion of a fuel, and an electric motor operated with an electric energy. The output of the drive power source may be electrically controlled depending upon the operating amount of the accelerator pedal or other accelerating member provided for accelerating the vehicle, or the drive power source may be mechanically connected to the accelerating member so that the output of the drive power source is directly controlled by the accelerating member.

The shifting action of the automatic transmission initiated while the input speed is lower than the synchronizing speed of the selected operating position includes not only a downshift from the higher-gear position to the selected operating position, but also a shifting action which involves initial releasing of the frictional coupling device and consequent reduction of the input speed of the automatic transmission when the accelerating member which has been operated is released to the non-operated position during running of the vehicle with the automatic transmission placed in the selected operating position, and subsequent engagement of the frictional coupling device when the accelerating member is operated. The latter shifting action will be described later with respect to a fifth preferred form of the invention. When the automatic transmission is shifted sown from the higher-gear position to the selected operating position, the selected operating position can be established according to the present invention by simply controlling only the engaging action of the corresponding frictional coupling device. Namely, the frictional coupling device which has been engaged to establish the higher-gear position may be released immediately after the generation of a command to effect the downshift to the selected operating position.

The engaging force of the frictional coupling device to effect the downshift to the selected operating position can be controlled in the same manner as used to effect the upshift to the selected operating position. However, the engaging force to effect the downshift may be controlled in a manner totally different from that used to effect the upshift.

In a first preferred form of the present invention, the automatic transmission includes a hydraulic cylinder operated to effect the engaging action of the frictional coupling device, and the apparatus further comprises a pressure regulating device for controlling a hydraulic pressure of the hydraulic cylinder. In this form of the invention, the overshoot engagement control device controls the pressure regulating device, to effect a feed-forward control of the hydraulic pressure of the hydraulic cylinder, and the overshoot engagement control device includes: time calculating means for calculating a first time required for the input speed of the automatic transmission to reach the synchronizing speed of the selected one operating position; a time data memory device which stores a second time required for a piston of the hydraulic cylinder to reach an engaging stroke end thereof; and timing determining means for comparing the first time with the second time, and thereby determining a point of time at which a supply of a pressurized fluid to the hydraulic cylinder is initiated, such that the piston has reached the engaging stroke end to initiate the generation of the engaging force of the frictional coupling device, when the input speed of the automatic transmission has substantially reached or exceeded the synchronizing speed.

In the present first preferred form of the invention, the frictional coupling device to establish the selected operating position is engaged by activation of the corresponding hydraulic cylinder, and the overshoot engagement control device controls the pressure regulating device to effect the feed-forward control of the hydraulic pressure of the hydraulic cylinder. The timing determining means of the overshoot engagement control device is basically adapted to determine the point of time at which the supply of the pressurized fluid to the hydraulic cylinder is initiated, such that the supply is initiated when the first time required for the input speed to reach the synchronizing speed, as calculated by the time calculating means, has become equal to the second time required for the piston of the hydraulic cylinder to reach the engaging stroke end, which second time is stored in the time data memory. By initiating the supply of the pressurized fluid to the hydraulic cylinder at the thus determined point of time, the piston of the hydraulic cylinder has reached the engaging stroke end to initiate the generation of the engaging force of the frictional coupling device, when the input speed of the automatic transmission has substantially reached or exceeded the synchronizing speed. In this preferred form of the invention, the overshoot engagement of the frictional coupling device can be always achieved at the appropriate timing, so as to minimize a shifting shock of the automatic transmission, which would take place due to a variation in the point of time at which the generation of the engaging force of the frictional coupling device is initiated.

The hydraulic cylinder used for engaging the frictional coupling device in the first preferred form of the invention may be replaced by other types of frictional coupling device such as an electromagnetic clutch which is engaged by an electromagnetic force. In the first preferred form of the invention using the hydraulic cylinder, the feed-forward control of the hydraulic pressure of the hydraulic cylinder is desirable. However, the hydraulic pressure may be controlled such that the piston of the hydraulic cylinder is held at a predetermined standby level slightly lower than the synchronizing speed, until the input speed of the automatic transmission has reached the synchronizing speed, and such that the hydraulic pressure is raised to fully engage the frictional coupling device.

In one advantageous arrangement of the first preferred form of the invention, the time calculating means detects a rate of change of the input speed, obtains the synchronizing speed on the basis of a speed ratio of the selected one operating position and an output speed of the automatic transmission, and calculates the first time by dividing a difference between the obtained synchronizing speed and the input speed by said rate of change of said input speed.

The output speed of the automatic transmission, which represents the vehicle running speed, may be considered substantially constant. However, the synchronizing speed may be obtained with higher accuracy, if the output speed and a rate of change of the output speed are used in addition to the input speed and the rate of change of the input speed. This manner of obtaining the synchronizing speed is desirable particularly where the frictional coupling device is engaged to effect a downshift of the automatic transmission to the selected operating position during coasting of the vehicle without an operation of the accelerating member. The input and output speeds of the automatic transmission may be replaced by the rotating speeds of other appropriate rotary members of the automatic transmission.

The second time required for the piston of the hydraulic cylinder to reach the engaging stroke end differs depending upon the hydraulic pressure in the hydraulic control circuit. Usually, this hydraulic pressure is adjusted according to the output of the vehicle drive source, for instance, the opening angle of the throttle valve of the engine. In this respect, it is preferred that the second time be determined or adjusted depending upon the output of the vehicle drive force (e.g, opening angle of the throttle valve). The second time may be determined on the basis of other parameters such as the temperature of the working fluid, which influence the second time. To eliminate a difference in the characteristic between the individual hydraulic cylinders, the second time may be determined by actually detecting the time required for the piston to reach the engaging stroke end. In this case, the second time stored in the time data memory is updated by learning compensation based on the detected time.

The timing determining means of the overshoot engagement control device is basically adapted to initiate the supply of the pressurized fluid to the frictional coupling device when the first time has become substantially equal to the second time. To prevent a torque from being transmitted to the engine through the automatic transmission, the point of time at which the supply is initiated may be purposely delayed so that the generation of the engaging force by the frictional coupling device is initiated only after the input speed of the automatic transmission has exceeded the synchronizing speed. The point of time at which the generation of the engaging force is initiated may be adjusted by controlling the pressure of the pressurized fluid or a pattern of change of the pressure.

In a second preferred form of this invention, the automatic transmission includes a hydraulic cylinder operated to effect the engaging action of the frictional coupling device, and the apparatus further comprises: manual shifting engagement control means operated in response to a manual operation to effect a manual downshift of the automatic transmission to the selected one operating position while the vehicle is running in a power-off state in which a drive force is not transmitted through the automatic transmission to drive wheels of the vehicle, the manual shifting engagement control means controlling a hydraulic pressure of the hydraulic cylinder in a manner different from that of the overshoot engagement control device; and transition releasing means operated in response to an increase in an amount of operation of an accelerating member for accelerating the vehicle, in the process of the manual downshift of the automatic transmission, for first draining the hydraulic cylinder to release the frictional coupling device, and then enabling the overshoot engagement control device to operate to control the engaging force of the selected one frictional coupling device.

The term "power-off state" of the vehicle is interpreted to means a state in which the drive force is not transmitted from a vehicle drive source such as an engine to the vehicle drive wheels through the automatic transmission. This "power-off state" includes not only a state in which the operator's required output of the drive power source is zero, namely, a state in which the accelerator pedal or other accelerating member for accelerating the vehicle is in the non-operated position, but also a state in which the vehicle drive force is not transmitted to the drive wheels because the operating amount of the accelerating member is smaller with respect to the running speed of the vehicle. The term "an increase in an amount of operation of an accelerating member" is interpreted to mean an operation of the accelerating member by the vehicle operator to increase the output of the vehicle drive source.

In the second preferred form of this invention, the manual shifting engagement control means is operated in response to a manual operation to effect a manual downshift of the automatic transmission to the selected operating position while the vehicle is in the power-off state, so that the hydraulic pressure of the frictional coupling device is controlled in a manner different from that of the overshoot engagement control device. When the accelerating member is operated to increase the output of the vehicle drive power source in the process of the manual downshift, the transition releasing means is operated to first drain the hydraulic cylinder of the frictional coupling device to release the frictional coupling device, and then enable the overshoot engagement control device to operate to effect the overshoot engagement of the frictional coupling device. In this control arrangement, the residual pressure in the hydraulic cylinder in the engagement control of the frictional coupling device by the manual shifting engagement control means will not influence the overshoot engagement control of the frictional coupling device, since the hydraulic cylinder is first drained to release the frictional coupling device before the overshoot engagement control is initiated. Accordingly, the engaging force of the frictional coupling device can be adequately controlled so that the piston of the hydraulic cylinder has reached the engaging stroke end to initiate the generation of the engaging force when the input speed of the automatic transmission has substantially reached or exceeded the synchronizing speed.

The manual shifting engagement control means is arranged to control the hydraulic pressure of the hydraulic cylinder, so as to smoothly increase an engine braking force to be applied to the vehicle in the manual downshift, on an assumption that the manual downshift is selected by the vehicle operator in the power-off state, in order to apply the engine brake to the vehicle. While the overshoot engagement control device according to the first preferred form of the invention described above is arranged to control the hydraulic pressure while taking into account the first time required for the input speed to reach the synchronizing speed, the manual shifting engagement control means according to the present second preferred form of the invention may be arranged to effect the overshoot engagement control of the frictional coupling device without taking into account the above-indicated first time (synchronizing time). The present second preferred form relates to the control of the frictional coupling device when the operating amount of the accelerating member is increased in the process of the manual downshift in the power-off state, that is, when the vehicle state is changed from the power-off state to the power-on state. The present control to first drain the hydraulic cylinder to release the frictional coupling device and then effect the overshoot engagement control of the frictional coupling device is desirable where the automatic transmission is commanded to be shifted down to the selected position in the process of the upshift from the selected position to the higher-gear position. The present control is also desirable in the sixth preferred form of the invention described later, where the operating amount of the accelerating member is increased in the process of releasing of the frictional coupling device by the power-off releasing means.

The manual shifting engagement control means may be operated only when the manual downshift of the automatic transmission is selected by a manual operation by the vehicle operator while the accelerating member is in the non-operated position. However, the manual shifting engagement control means may be operated when the manual downshift is selected while the accelerating member is in an operated position, as long as the power-off state (in which a vehicle drive force is not transmitted from the vehicle drive power source to the vehicle drive wheels through the automatic transmission) is detected, for example, on the basis of the rotating speeds of the input and output members of a torque converter connected to the automatic transmission.

In a third preferred form of this invention, the overshoot engagement control device controls the engaging force of the frictional coupling device when the automatic transmission is commanded to be shifted down to the selected one operating position during coasting of the vehicle while an accelerating member for accelerating the vehicle is placed in a non-operated position, such that the input speed is first raised above the synchronizing speed and is then lowered down toward the synchronizing speed, and such that the engaging force is not generated by the frictional coupling device while the input speed is not higher than the synchronizing speed.

The term "coasting" of the vehicle is interpreted to mean a running of the vehicle with the accelerating member placed in the non-operated position, and the term "commanded to be shifted down to the selected one operating position during coasting" is interpreted to mean a downshift of the automatic transmission to the lower-gear position having the higher speed ratio, in response to a reduction of the vehicle running speed without an operation of the accelerating member. Usually, the downshift during coasting of the vehicle does not involve an engine brake application to the vehicle. In the present third preferred form of the invention, the overshoot engagement control means is arranged to effect the overshoot engagement of the frictional coupling device such that the input speed is first raised above the synchronizing speed and is then lowered down toward the synchronizing speed, as described above with respect to the apparatus constructed according to the principle of the invention.

In the third preferred form of the invention, the overshoot engagement of the frictional coupling device is achieved upon generation of a command to effect a downshift of the automatic transmission to the selected operating position during coasting of the vehicle. The overshoot engagement control device controls the engaging force of the frictional coupling device such that the engaging force is not generated by the frictional coupling device while the input speed of the automatic transmission is not higher than the synchronizing speed, so that the drive force is not transmitted from the drive wheels to the vehicle drive power source through the automatic transmission, namely, an engine brake is not applied to the vehicle, when the automatic transmission is shifted down to the selected operating position.

In this third preferred form of the invention, too, the moment of generation of the engaging force of the frictional coupling device may be adjusted by suitably determining the point of time at which the supply of the pressurized fluid to the frictional coupling device is initiated.

In a fourth preferred form of this invention, the apparatus further comprises means for holding the frictional coupling device in its released state while an accelerating member for accelerating the vehicle is placed in a non-operated position in the process of a downshift of the automatic transmission to the selected one operating position during coasting of the vehicle, and wherein the overshoot engagement control device is operated, when the accelerating member is operated, to control the engaging force of the frictional coupling device such that the input speed is first raised above the synchronizing speed and is then lowered down to the synchronizing speed.

The phrase "when the accelerating member is operated" means, for example, an operation of an accelerator pedal by the vehicle operator to increase the output of the vehicle drive power source. The phrase "while an accelerating member for accelerating the vehicle is placed in a non-operated position" means that the accelerating member is not in operation, in the presence of the vehicle operator's desire to accelerate the vehicle.

In the fourth preferred form of the invention, the frictional coupling device is held in the released state while the accelerating member is not in operation in the process of a downshift of the automatic transmission to the selected operating position during coasting of the vehicle. This control arrangement prevents the application of an engine brake to the vehicle, namely, prevents the automatic transmission to transmit a negative torque from the drive wheels to the vehicle drive power source. Further, when the accelerating member is operated, the overshoot engagement control device controls the engaging force of the frictional coupling torque, so that the vehicle drive force can be generated in a short time after the operation of the accelerating member.

The fourth preferred form of the invention may be adapted such that the frictional coupling device is engaged after the input speed has exceeded the synchronizing speed, while the accelerating member is held in the non-operated position in the process of the coasting downshift to the selected operating position. However, the frictional coupling device may be held in the released state even after the input shaft has exceeded the synchronizing speed. Then, the frictional coupling device may be controlled according to the following fifth preferred embodiment of the invention.

In a fifth preferred form of this invention, the apparatus further comprises power-off releasing means for releasing the frictional coupling device when the vehicle is brought into a power-off state in which a drive force is not transmitted through the automatic transmission to drive wheels of the vehicle, during running of the vehicle while the automatic transmission is placed in the selected one operating position with the frictional coupling device placed in an engaged state thereof, and wherein the overshoot engagement control device is operated in response to an increase in an amount of operation of the accelerating member operated while the frictional coupling device is held in a released state thereof by the power-off releasing means, to control the engaging force of the frictional coupling device such that the input speed is first raised above the synchronizing speed and is then lowered down to the synchronizing speed.

In the fifth preferred form of the invention, the frictional coupling device is released by the power-off releasing means when the vehicle is brought into the power-off state during running of the vehicle while the automatic transmission is placed in the selected operating position with the frictional coupling device placed in the engaged state. In the absence of a one-way clutch to establish the selected operating position, this arrangement is effective to prevent the application of an engine brake to the vehicle when the vehicle is brought into the power-off state. When the operating amount of the accelerating member is increased while the frictional coupling device is held in the released state by the power-off releasing means, the frictional coupling device is engaged by the overshoot engagement control means, so that the drive force can be produced in a short time after the operating amount of the accelerating member has been increased. Thus, the frictional coupling device can be adequately released and engaged depending upon when the vehicle is placed in the power-off state or power-on state, and the drive force can be more suitably produced by overshoot engagement of the frictional coupling device, than where the one-way clutch is used to prevent the engine brake application.

The power-off releasing means may be operated only when the vehicle is placed in the power-off state with the accelerating member being released to the non-operated position. However, the power-off releasing means may be operated while the accelerating member is in an operated position, as long as the power-off state is detected, for example, on the basis of the rotating speeds of the input and output members of a torque converter connected to the automatic transmission.

BRIEF DESCRIPTION OF THE DRAWINGS

The above and other objects, features, advantages and technical and industrial significance of the present invention will be better understood and appreciated by reading the following detailed description of a presently preferred embodiment of the invention, when considered in connection with the accompanying drawings, in which:

FIG. 2 is a view indicating a relationship between a plurality of operating positions of an automatic transmission of the power transmitting system of FIG. 1, and combinations of operating states of hydraulically operated frictional coupling devices provided to establish the operating positions;

FIG. 16 is a flow chart illustrating a routine for controlling a 3-2 downshift of the automatic transmission shown in FIG. 1;

FIG. 29 is a time chart indicating changes of various parameters, by way of example, when the brake B3 is controlled according to the routine of FIG. 28.

DETAILED DESCRIPTION OF THE PREFERRED EMBODIMENTS

Figure 1:
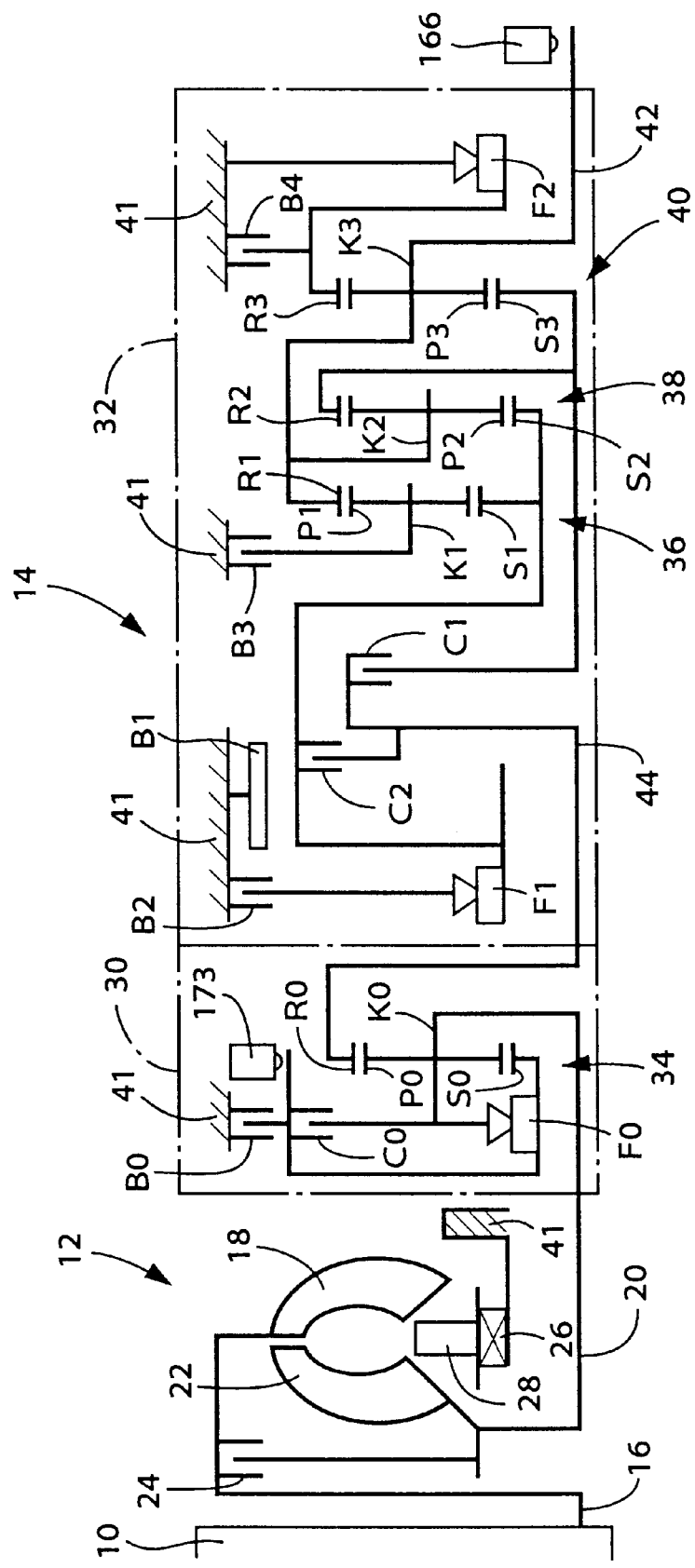
FIG. 1 is a schematic view illustrating a power transmitting system of an automotive vehicle to which the present invention is applied.

Referring first to the schematic view of FIG. 1, there is shown a power transmitting system of an automotive vehicle to which the present invention is applied. This power transmitting system includes a torque converter 12 and an automatic transmission 14 which are operatively connected to an output of a drive power source in the form of an engine 10. The engine 10 may be an internal combustion engine of an air-fuel mixture supply type or a fuel injection type. The engine 10 may be replaced by other types of drive power source such as an external combustion engine. The output of the engine 10 is transmitted to drive wheels of the vehicle through the torque converter 12, automatic transmission 10, and a differential gear and an drive axle which are well known in the art.

The torque converter 12 includes a pump impeller 18 connected to a crankshaft 16 of the engine 10, a turbine impeller 22 connected to an input shaft 20 of the automatic transmission 14, a lock-up clutch 24 which is engaged for direct connection of the pump and turbine impellers 18, 22, and a stator 28 which is prevented by a one-way clutch 26 from rotating in one direction.

The automatic transmission 14 includes a first transmission unit 30 having a high-gear position and a low-gear position, and a second transmission unit 32 having a rear-drive position and four forward-drive positions. The first transmission unit 30 includes a High-Low planetary gear set 34 having a sun gear S0, a ring gear R0, a carrier K0, and a planetary gear P0 which is rotatably supported by the carrier K0 and which meshes with the sun gear S0 and the ring gear R0. The first transmission unit 30 further includes a clutch C0 and a one-way clutch F0 which are disposed between the sun gear S0 and the carrier K0, and a brake B0 disposed between the sun gear S0 and a housing 41 of the automatic transmission 14.

The second transmission 32 includes a first planetary gear set 36, a second planetary gear set 38 and a third planetary gear set 40. The first planetary gear set 36 has a sun gear S1, a ring gear R1, a carrier K1, and a planetary gear P1 which is rotatably supported by the carrier K1 and which meshes with the sun gear S1 and the ring gear R1. The second planetary gear set 38 has a sun gear S2, a ring gear R2, a carrier K2, and a planetary gear P2 which is rotatably supported by the carrier K2 and which meshes with the sun gear S2 and the ring gear R2. The third planetary gear set 40 has a sun gear S3, a ring gear R3, a carrier K3, and a planetary gear P3 which is rotatably supported by the carrier K3 and which meshes with the sun gear S3 and the ring gear R3.

The sun gears S1 and S2 are formed integrally with each other, and the ring gear R1 and the carriers K2 and K3 are formed integrally with each other. The carrier K3 is connected to an output shaft 42 of the automatic transmission. The ring gear R2 is integrally connected to the sun gear S3. A clutch C1 is disposed between an intermediate shaft 44 and the ring and sun gears R2 and S3, while a clutch C2 is disposed between the intermediate shaft 44 and the sun gears S1 and S2. A band brake B1 for inhibiting rotation of the sun gears S1, S2 is disposed on the housing 41. A series connection of a one-way clutch F1 and a brake B2 is disposed between the housing 41 and the sun gears S1, S2. This one-way clutch F1 is adapted to be engaged when a torque acts on the sun gears S1, S2 in the direction opposite to the direction of rotation of the input shaft 20.

A brake B3 is disposed between the carrier K1 and the housing 41, and a parallel connection of a brake B4 and a one-way clutch F2 is disposed between the ring gear R3 and the housing 41. This one-way clutch F2 is adapted to be engaged when a torque acts on the ring gear R3 in the reverse direction.

Figure 5:
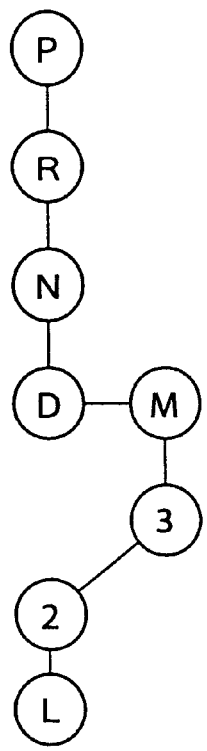
FIG. 5 is a view indicating an arrangement of operanting positions of a transmission shift lever shown in FIG. 3.

The automatic transmission 14 which is constructed as described above has one rear-drive position "Rev", and five forward-drive positions, namely, a first-speed position "1st", a second-speed position "2nd", a third-speed position "3rd", a fourth-speed position "4th" and a fifth-speed position "5th", as indicated in FIG. 2. The five forward-drive positions have respective different speed ratios. In FIG. 2, white circles indicate the engaged states of the clutches C0–C2, brakes B0–B4 and one-way clutches F0–F2, and blanks indicate the released states, while black circles indicate the engaged states which are established when an engine brake is applied to the vehicle with a shift lever 172 (FIG. 3) placed in any one of engine braking positions. As shown in FIG. 5, the shift lever 172 has a PARKING position "P", a REVERSE position "R", a NEUTRAL position "N", a DRIVE position "D", a MANUAL position "M", a THIRD position "3", a SECOND position "2" and a LOW position "L". Of these positions, the MANUAL position "M", THIRD position "3", SECOND position "2" and LOW position "L" are the engine braking positions. Namely, when the shift lever 172 is placed in any one of these engine braking positions "M", "3", "2" and "L", an engine brake is applicable to the vehicle with the automatic transmission 14 placed in the highest one of the forward-drive positions which can be established in the selected engine braking position of the shift lever 162.

When the shift lever 172 is placed in the LOW position "L" in which the automatic transmission 14 can be placed in only the first-speed position "1st", an engine brake is applied to the vehicle with the brake B4 placed in the engaged state, if the vehicle is coasting in a POWER-OFF state with an accelerator pedal 150 held in the non-operated position. On the other hand, when the vehicle is coasting in the POWER-OFF state with the accelerator pedal 150 held in the non-operated position while the automatic transmission 14 is placed in the first-speed position "1st" with the shift lever 172 placed in the DRIVE position "D", an engine brake is not applied to the coasting vehicle, since the one-way clutch F2 is permitted to slip and the ring gear R3 is permitted to rotate under non load, disabling the automatic transmission 14 to transmit a torque from the drive wheels to the engine 10. When the shift lever 172 is placed in the SECOND position "2" in which the automatic transmission 14 can be placed in one of the first-speed and second-speed positions "1st", "2nd", an engine brake is applicable to the vehicle with the clutch C0 placed in the engaged state during coasting of the vehicle with the automatic transmission 14 placed in the second-speed position "2nd". When the vehicle is coasting while the automatic transmission 14 is placed in the second-speed position "2nd" with the shift-lever 172 placed in the DRIVE position "D", no engine brake is applicable to the coasting vehicle since the clutch C0 is released to permit the one-way clutch F0 to slip. When the vehicle is coasting while the automatic transmission 14 is placed in the third-speed position "3rd" with the shift lever 172 placed in the THIRD position "3" in which the automatic transmission 14 can be placed in one of the first-speed, second-speed and third-speed positions "1st", "2nd" and "3rd", an engine brake is applicable to the vehicle with the brake B1 placed in the engaged state. When the vehicle is coasting while the automatic transmission 14 is placed in the third-speed position "3rd" with the shift lever 172 placed in the DRIVE position "D", no engine brake is applicable to the coasting vehicle, since the brake B1 is released to permit the one-way clutch F1 to slip.

The shift lever 172 is supported by a suitable support mechanism such that the PARKING, REVERSE, NEUTRAL, DRIVE, MANUAL, THIRD, SECOND and LOW positions "P", "R", "N", "D", "N", "M", "3", "2" and L" are selected by moving the shift lever 172 in the running or longitudinal direction of the vehicle, while the DRIVE and MANUAL positions "D" and "M" are selected by moving the shift lever 172 in the lateral or transverse direction of the vehicle, as indicated in FIG. 5. This shift lever 172 is mechanically connected to a manual vale (not shown) incorporated in a hydraulic control device 184 shown in FIG. 3.

Figure 6:
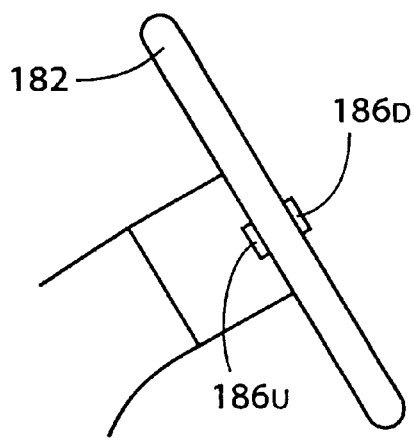
FIG. 6 is a side elevational view of a steering wheel equipped with an upshift switch and a downshift switch.

The vehicle has a steering wheel 182 which carries on its upper rear surface a downshift switch 186D and on its lower front surface an upshift switch 186U, as shown in FIG. 6. These downshift and upshift switches 186D and 186U are operable while the shift lever 172 is placed in the MANUAL position "M". The automatic transmission 14 is manually shifted down each time the downshift switch 186D is pressed downwards, and is manually shifted up each time the upshift switch 186U is pressed upwards.

The clutches C0–C2 and brakes B0–B4 described above are hydraulically operated frictional coupling devices of multiple disc type, single disc type or band type, whose friction members are operated to engage each other by hydraulic cylinders which are activated by a pressurized working fluid. The hydraulic cylinders of the frictional coupling devices are engaged and released under the control of the hydraulic control device 184 shown in FIG. 3.

Figure 4:
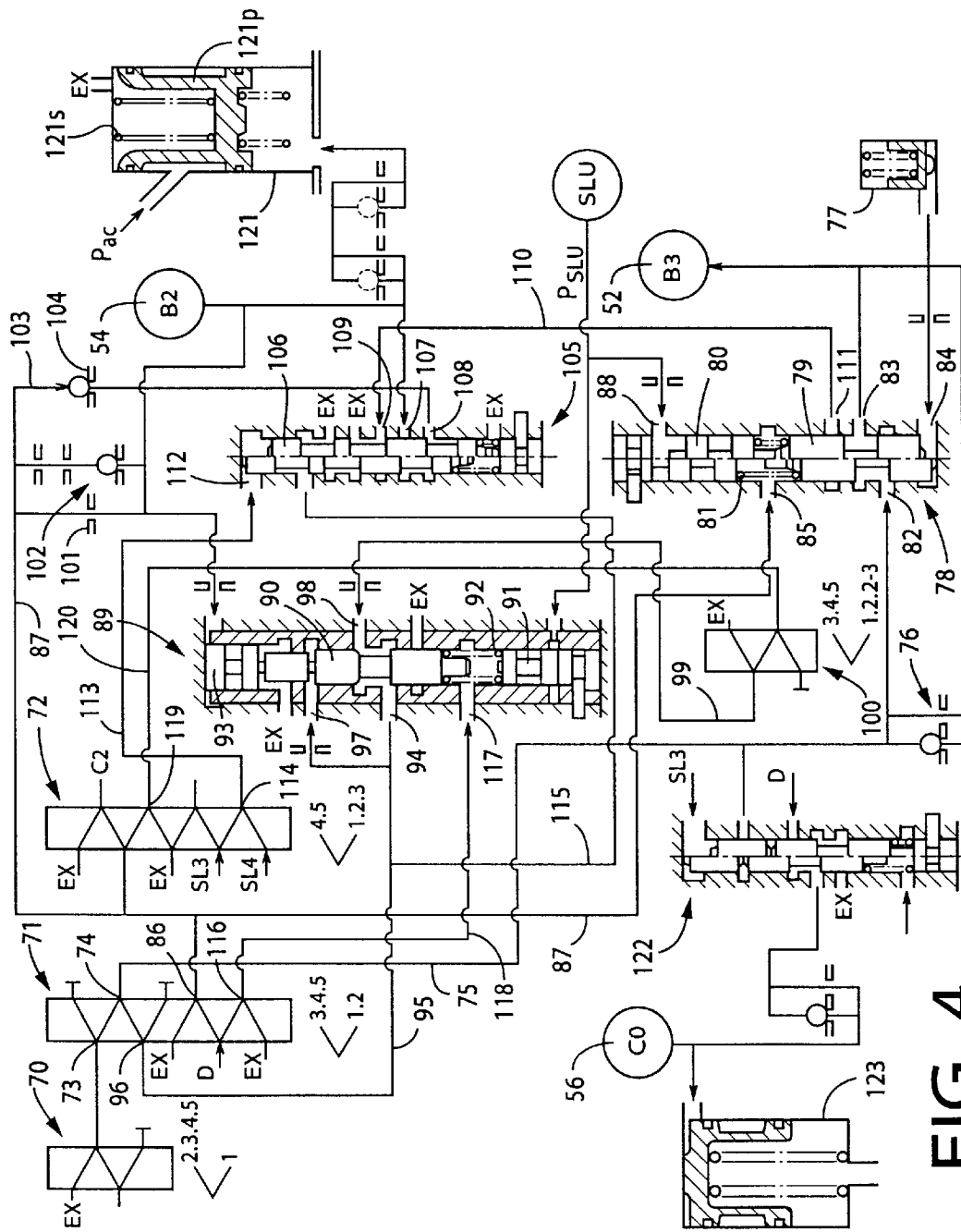
FIG. 4 is a diagram showing a part of a hydraulic control device shown in FIG. 3.

The hydraulic control device 184, the hydraulic circuity of which is shown in FIG. 4, includes a 1-2 shift valve 70, a 2-3 shift valve 71, and a 3-4 shift valve 72. Below the rectangular blocks representing these shift valves 70, 71, 72 in FIG. 4, there are given numerals indicating the forward-drive positions of the automatic transmission 14 which are established when the shift valves 70, 71, 72 are placed in the different operating positions for selective communication of their ports.

Figure 3:
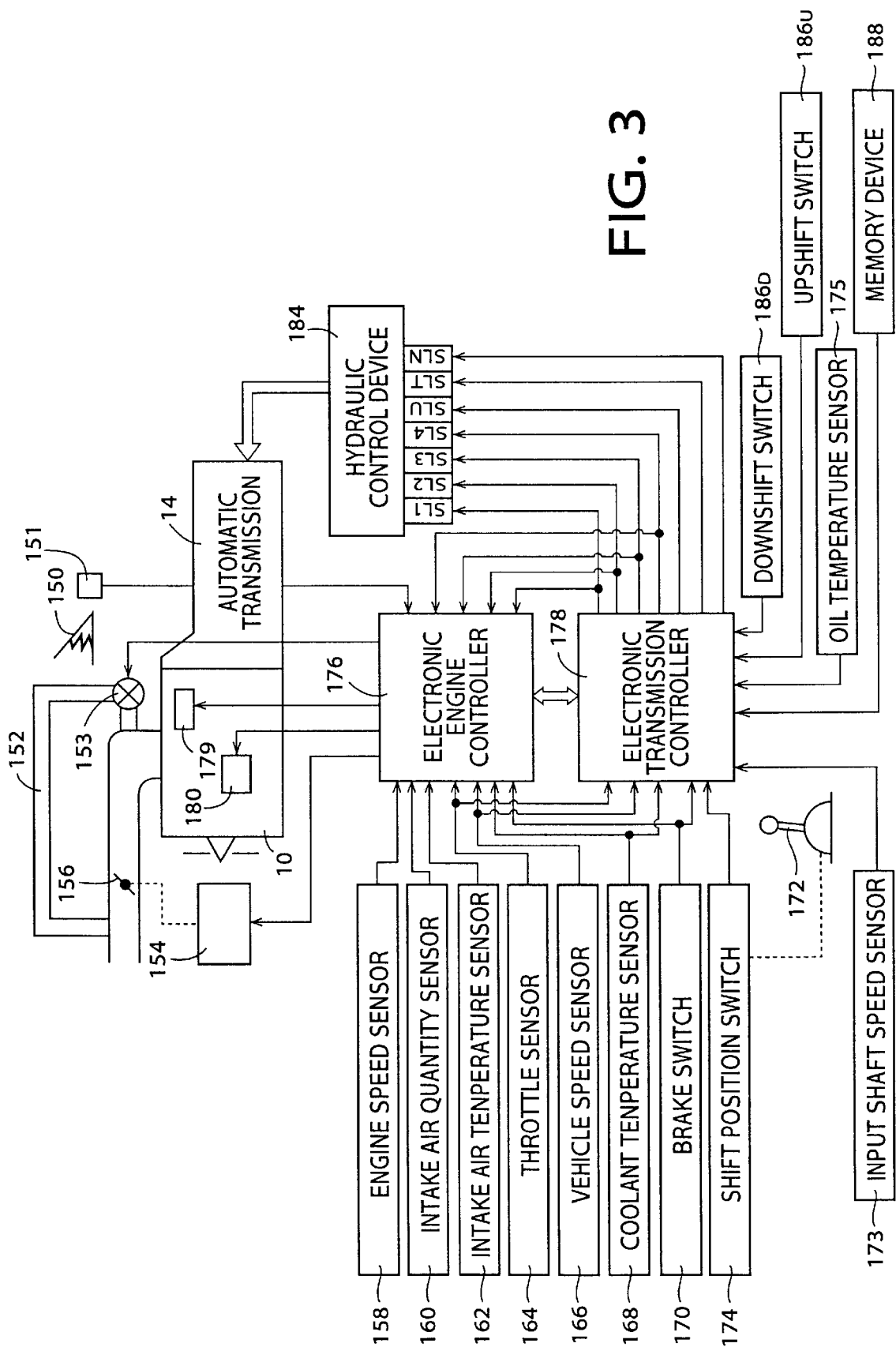
FIG. 3 is a block diagram showing an electric control system for controlling an engine of the vehicle and the automatic transmission of FIG. 1.

The 2-3 shift valve 71 includes an input port 73, and a brake port 74 which communicates with the input port 73 for establishing the first-speed and second-speed positions "1st", "2nd". To the brake port 74, there is connected through an oil passage 75 a hydraulic cylinder 52 of the brake B3. The oil passage 75 is provided with an orifice 76. To a portion of the oil passage 75 between the orifice 76 and the brake B3, there is connected a damper valve 77 which achieves a damping action to receive a relatively small amount of the pressurized fluid when the brake B3 is abruptly supplied with the pressurized fluid having a line pressure PL. The line pressure PL is controlled by a linear solenoid valve SLT (FIG. 3), according to a presently required output of the engine 10 as represented by an opening angle $\theta_{TH}$ of a throttle valve 156 (FIG. 3).

Reference numeral 78 denotes a B3 control valve for directly controlling an engaging hydraulic pressure PB3 of the brake B3. The B3 control valve 78 has: a spool 79; a plunger 80; a spring 81 interposed between the spool 79 and the plunger 80; an input port 82 which is selectively closed and opened by the spool 79; an oil passage 75 connected to the input port 82; and an output port 83 which is selectively brought into communication with the input port 82 and which is connected to the brake B3. The B3 control valve 78 further has a feedback port 84 partially defined by one end of the spool 79 remote from the plunger 80, and a port 85 which is open in a space in which the spring 81 is disposed. The port 85 is connected through an oil passage 87 to a port 86 of the 2-3 shift valve 71, from which a DRIVE position pressure (line pressure PL) is delivered when one of the third-speed, fourth-speed and fifth-speed positions "3rd", "4th" and "5th" is established. The B3 control valve 78 further has a control port 88 which is partially defined by one end of the plunger 80 remote from the spool 79. To this control port 88, there is connected a linear solenoid valve SLU (FIG. 3), so that the control port 88 receives a SLU pressure $P_{SLU}$ from the linear solenoid valve SLU. The B3 control valve 78 is constructed such that the output pressure delivered from the output port 83 is controlled on the basis of the biasing force of the spring 81 and the pressure applied to the port 85, and such that the biasing force of the spring 81 increases with an increase in the SLU pressure $P_{SUL}$ applied to the control port 88.

Reference numeral 89 in FIG. 4 denotes a 2-3 timing valve which has: a spool 90 having a small-diameter land and two large-diameter lands; a first plunger 91; a spring 92 interposed between the spool 90 and the first plunger 91; and a second plunger 92 disposed on one side of the spool 91 remote from the first plunger 91. The 2-3 timing valve 89 further has a port 94 formed at an intermediate portion thereof and connected to an oil passage 95 which is connected to a port 96 of the 2-3 shift valve 71 which is brought into communication with the brake port 74 when one of the third-speed, fourth-speed and fifth-speed positions "1st", "2nd" and "3rd" is established. The oil passage 95 is further connected through an orifice to a port 97 which is open between the small-diameter land and one of the two large-diameter lands indicated above. The 2-3 timing valve 89 further has a port 98 which is selectively brought into communication with the above-indicated port 94 and which is connected through an oil passage 99 to a solenoid relay valve 100. The linear solenoid valve SLU is connected a chamber which is partially defined by one end of the first plunger 91 remote from the spool 90, while a hydraulic cylinder 54 of the brake B2 is connected through an orifice to a chamber which is partially defined by one end of the second plunger 93 remote from the spool 90.

The oil passage 87 indicated above is also connected to the brake B2, and is provided with a small-diameter orifice 101 and an orifice 102 having a check ball. To the oil passage 86 is connected an oil passage 103 provided with a large-diameter orifice 104 having a check ball which is opened when the pressurized fluid is discharged from the brake B2. The oil passage 103 is connected to an orifice control valve 105 which will be described.

The orifice control valve 105 is provided to control the rate at which the pressurized fluid is discharged from the brake B2. The orifice control valve 105 includes a spool 106, and has a port 107 formed in an intermediate portion thereof so as to be opened and closed by the spool 106. The port 107 is connected to the brake B2. The orifice control valve 105 further has a port 108 formed below the port 107 as seen in FIG. 4. The port 108 is connected to the above-indicated oil passage 103. The valve 105 further has a port 109 formed above the port 107 connected to the brake B2. The port 108, which is selectively brought into communication with a drain port, is connected through an oil passage 110 to a port 111 of the above-indicated B3 control valve 78. The port 111 is selectively brought into communication with the output port 83 connected to the brake B3.

The orifice control valve 105 further has a control port 112 which is partially defined by one end of the spool 106 remote from the spring biasing the spool 106. The control port 112 is connected through an oil passage 113 to a port 114 of the 3-4 shift valve 72. The port 114 delivers a SL3 pressure of a third solenoid-operated valve SL3 (FIG. 3) when one of the third-speed, second-speed and first-speed positions "3rd", "2nd" and "1st" is established, and a SL4 pressure of a fourth solenoid-operated valve SL4 (FIG. 3) when one of the fourth-speed and fifth-speed positions "4th", "5th" is established. The above-indicated oil passage 95 is connected to an oil passage 115, which in turn is connected to the orifice control valve 105. The oil passage 115 is selectively brought into communication with a drain port of the valve 105.

The 2-3 shift valve 71 further has a port 116 from which the DRIVE pressure is delivered when the first-speed or second-speed position "1st", "2nd" is established. The port 116 is connected through an oil passage 118 to a port 117 of the 2-3 timing valve 89, which port 117 is open in a space in which the spring 92 is disposed. The 3-4 shift valve 72 has a port 119 which is brought into communication with the oil passage 86 when one of the first-, second- and third-speed positions "1st", "2nd", "3rd" is established. The port 119 is connected through an oil passage 120 to the solenoid relay valve 100.

Reference numeral 121 in FIG. 4 denotes a B2 accumulator for the brake B2. The B2 accumulator 121 has a back-pressure chamber which receives an accumulator control pressure $P_{ac}$ which has been regulated according to a SLN pressure $P_{SLN}$ of a linear solenoid valve SLN (FIG. 3). When the 2-3 shift valve 71 is switched when the automatic transmission 14 is shifted up from the second-speed position "2nd" to the third-speed position "3rd", the DRIVE pressure (line pressure PL) is applied through the oil passage 87 to the hydraulic cylinder 54 of the brake B2. With this line pressure PL, an upward movement of a piston 121p of the B2 accumulator 121 is initiated. As long as the piston 121p is moved upward, a pressure $P_{B2}$ applied to the brake B2 is held substantially constant at a level at which a force based on the pressure $P_{B2}$ is equal to a sum of a biasing force of a spring 121s biasing the piston 121p in the downward direction and a force based on the above-indicated accumulator control pressure $P_{ac}$ which also biases the piston 121p in the downward direction. Described more precisely, as the spring 121s is elastically compressed, the pressure $P_{B2}$ is gradually raised. When the piston 121p has reached its uppermost position, the pressure $P_{B2}$ has been raised to the line pressure PL. That is, the engaging pressure $P_{B2}$ of the brake B2 during the movement of the piston 121p is determined by the accumulator control pressure $P_{ac}$.

The accumulator control pressure $P_{ac}$ is applied to not only the accumulator 121 for the brake B2 which is engaged to establish the third-speed position "3rd", but also an accumulator for the clutch C1 which is engaged to establish the first-speed position "1st", an accumulator for the clutch C2 which is engaged to establish the fourth-speed position "4th", and an accumulator for the brake B0 which is engaged to establish the fifth-speed position "5th". Thus, the accumulator control pressure $P_{ac}$ is used to control the pressures of those brakes B2 and B0 and clutches C1 and C2 in the process of engaging action thereof.

Reference numeral 122 in FIG. 4 denotes a C0 exhaust valve, and reference numeral 123 denotes a C0 accumulator for the clutch C0. The C0 exhaust valve 122 is provided to apply a pressurized fluid to a hydraulic cylinder 56 of the clutch C0 for engaging the clutch C0, in order to apply an engine brake to the vehicle during coasting of the vehicle while the automatic transmission 14 is placed in the second-speed position "2nd" with the shift lever 172 placed in the SECOND position "2".

In the hydraulic control device 184 constructed as described above by reference to FIG. 4, it is possible to directly control the engaging hydraulic pressure $P_{B3}$ of the brake B3 by means of the B3 control valve 78 while the port 111 of the valve 78 is in communication with the drain port. The engaging pressure $P_{B3}$ can be regulated by the linear solenoid valve SLU. When the spool 106 of the orifice control valve 105 is in the position indicated at left in FIG. 4, the pressurized fluid can be discharged from the brake B2 through the orifice control valve 1051 at a controllable rate.

When the automatic transmission 14 is shifted up from the second-speed position "2nd" to the third-speed position "3rd", the brake B3 is released while at the same time the brake B2 is engaged. This upshift is a so-called "clutch-to-clutch shifting action" of the automatic transmission 14. In this clutch-to-clutch shifting action, a shifting shock of the transmission 14 can be suitably reduced by controlling the hydraulic pressure of the brake B3 during its releasing action and the hydraulic pressure of the brake B2 during its engaging action, on the basis of the input torque of the input shaft 20 of the transmission 14. In other shifting actions of the automatic transmission 14, the hydraulic pressure of the clutch C1, C2 or brake B0 during the engaging or releasing action can be regulated by controlling the duty ratio of the linear solenoid valve SLN.

Referring to the block diagram of FIG. 3, an acceleration sensor 151 is provided to detect an operating amount $A_{cc}$ of the accelerator pedal 150. The accelerator pedal 150 functions as a vehicle accelerating member whose operating amount $A_{cc}$ is considered to represent the presently required output of the engine 10. Within an intake pipe of the engine 10 of the vehicle, there is disposed the above-indicated throttle valve 156 whose opening angle $\theta_{TH}$ is changed by a throttle actuator 154, depending upon the operating amount $A_{cc}$ of the accelerator pedal 150. A by-pass passage 152 is connected to the intake pipe, so as to by-pass the throttle valve 156. In the by-pass passage 152, there is disposed an idling speed control valve (ISC valve) 153 for controlling the quantity of intake air of the engine 10 when the throttle valve 156 is fully closed. The ISC valve 153 functions to control the idling speed of the engine 10.

The electric control system for the power transmitting system includes various sensors, detectors and switches such as: an engine speed sensor 158 for detecting a rotating speed $N_E$ of the engine 10; an intake air quantity sensor 160 for detecting an intake air quantity Q of the engine 10; an intake air temperature sensor 162 for detecting a temperature $T_A$ of the intake air; a throttle sensor 164 for detecting the opening angle $\theta_{TH}$ of the throttle valve 156, the throttle sensor 164 being equipped with an idling detector switch for detecting the idling state of the engine 10; a vehicle speed sensor 166 for detecting a rotating speed $N_{OUT}$ of the output shaft 42 of the automatic transmission 14, for thereby obtaining a running speed V of the vehicle; a coolant temperature sensor 168 for detecting a temperature $T_W$ of the coolant water of the engine 10; a brake switch 170 for detecting an operation of a brake pedal; a shift position sensor 174 for detecting a presently selected position $P_{SH}$ of the shift lever 172; an input shaft speed sensor 173 for detecting a rotating speed $N_{IN}$ of the input shaft 20 of the automatic transmission 14, namely, a rotating speed $N_{C0}$ of the clutch C0, which is equal to a rotating speed $N_T$ of the turbine impeller 22 of the torque converter 12; and an oil temperature sensor 175 for detecting a temperature $T_{OIL}$ of the working fluid in the hydraulic control device 184. The control system uses an electronic engine controller 176 and an electronic transmission controller 178, which receive output signals of the above-indicated sensors and switch indicative of the engine speed $N_E$, intake air quantity Q, intake air temperature $T_A$, throttle opening angle $\theta_{TH}$, vehicle speed V, coolant temperature $T_W$, braking operating condition BK, selected position $P_{SH}$ of the shift lever 172, input shaft speed $N_{IN}$ (turbine impeller speed $N_{CO}$), and oil temperature $T_{OIL}$.

Figure 7:
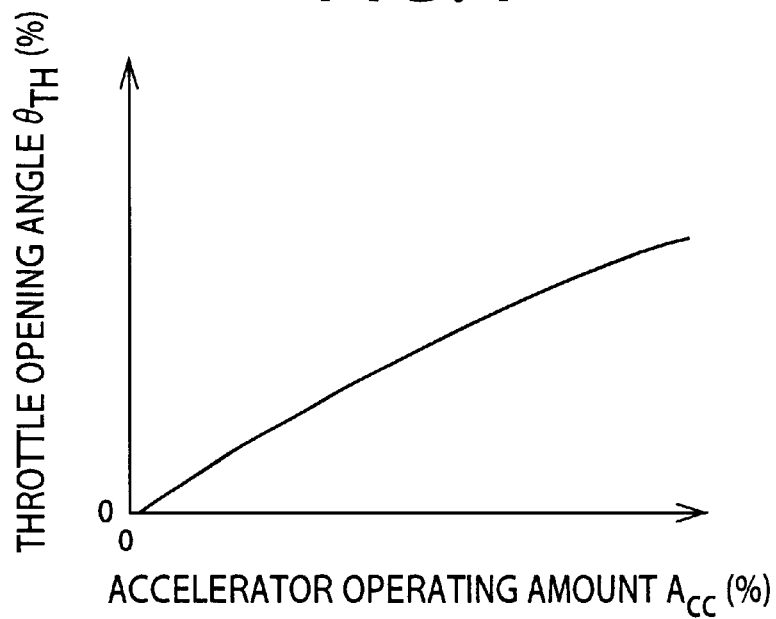
FIG. 7 is a graph indicating a characteristic of control of a throttle actuator shown in FIG. 3, more specifically, a relationship between the opening angle $\theta_{TH}$ of a throttle valve and an operating amount $A_{cc}$ of an accelerator pedal.

The engine controller 176 shown in FIG. 3 is constituted by a so-called microcomputer incorporating a central processing unit (CPU), a random-access memory (RAM), a read-only memory (ROM), and an input/output interface. The CPU operates to process the various input signals, according to control programs stored in the ROM while utilizing a temporary data storage function of the RAM. The engine controller 176 controls: a fuel injector valve 179 for controlling the amount of injection of a fuel into the engine 10; an ignitor 180 for controlling an ignition timing of the engine 10; the above-indicated ISC valve 153 for controlling the idling speed of the engine 10; the above-indicated throttle actuator 154 to control the throttle valve 156, for effecting a traction control well known in the art, that is, for controlling the drive forces applied to the vehicle drive wheels, so as to prevent excessive slipping of the drive wheels. For example, the engine controller 176 is arranged to control the actuator 154 on the basis of the operating amount $A_{cc}$ of the accelerator pedal 150, such that the opening angle $\theta_{TH}$ of the throttle valve 156 increases with an increase in the operating amount $A_{cc}$ of the accelerator pedal 150, according to a predetermined relationship between the operating amount $A_{cc}$ and the opening angle $\theta_{TH}$, as shown in FIG. 7. The engine controller 176 is connected to the transmission controller 178, so that each of these controllers 176, 178 may receive necessary signals from the other controller, through a transmitter and a receiver provided for each controller 176, 178.

Figure 8:
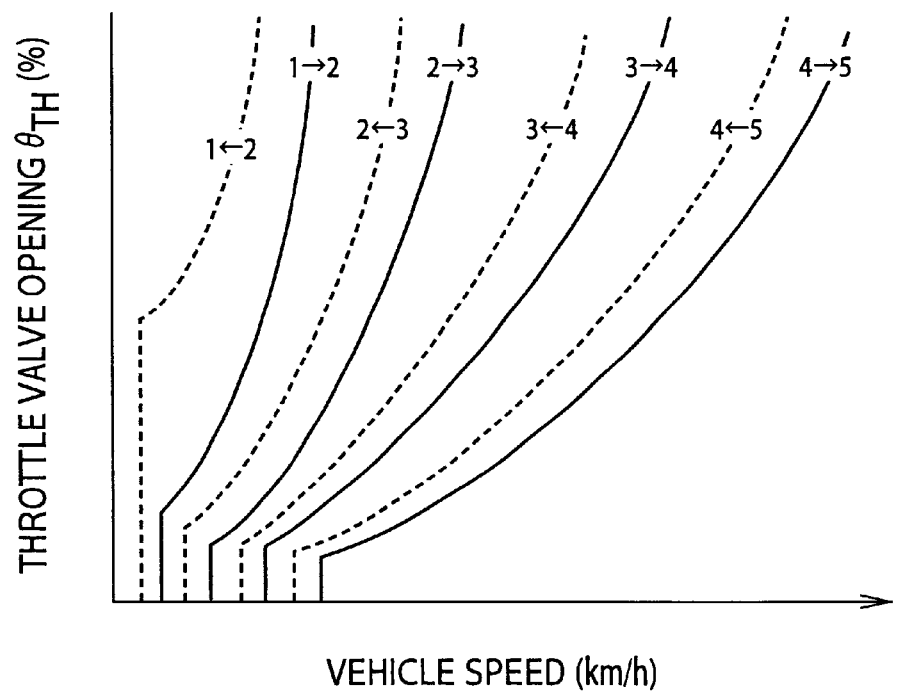
FIG. 8 is a graph indicating upshift and downshift boundary lines used by an electronic transmission control device shown in FIG. 3, for controlling shifting actions of the automatic transmission.

The transmission controller 178 is also constituted by a so-called microcomputer similar to that of the engine controller 176. The CPU of the transmission controller 178 operates to process the input signals according to control programs stored in the ROM while utilizing a temporary data storage function of the RAM, for controlling the solenoid-operated valves SL1, SL2, SL3, SL4, and the linear solenoid valves SLU, SLT, SLN. Described in detail, the transmission controller 178 selects an a appropriate one of the five forward-drive positions "1" through "5" of the automatic transmission 14, on the basis of the detected throttle opening angle $\theta_{TH}$ and vehicle speed V, and according to upshift and downshift boundary lines whose data are stored in the ROM. Each upshift or downshift boundary line is a relationship between the vehicle speed V and the throttle opening angle $\theta_{TH}$, as shown in FIG. 8 wherein solid lines represent the upshift boundary lines while broken lines represent downshift boundary lines. The transmission controller 178 controls the solenoid-operated valves SL1–SL4 so as to shift the automatic transmission 14 to the selected forward-drive position.

Figure 9:
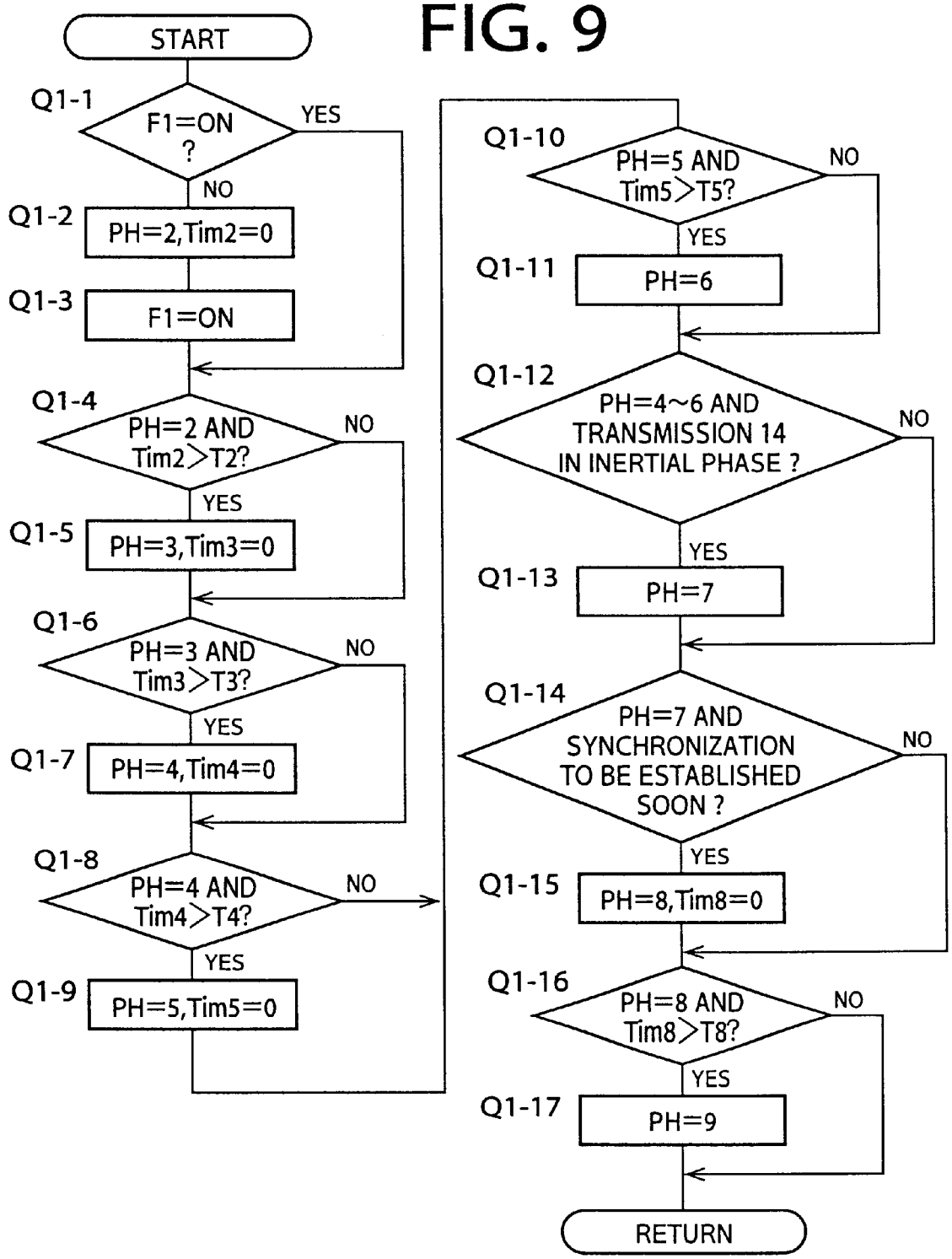
FIG. 9 is a flow chart illustrating a routine for controlling a 1-2 upshift of the automatic transmission, wherein a control phase PH of a brake B3 is determined when the pressure in the brake B3 is directly controlled.
Figure 10:
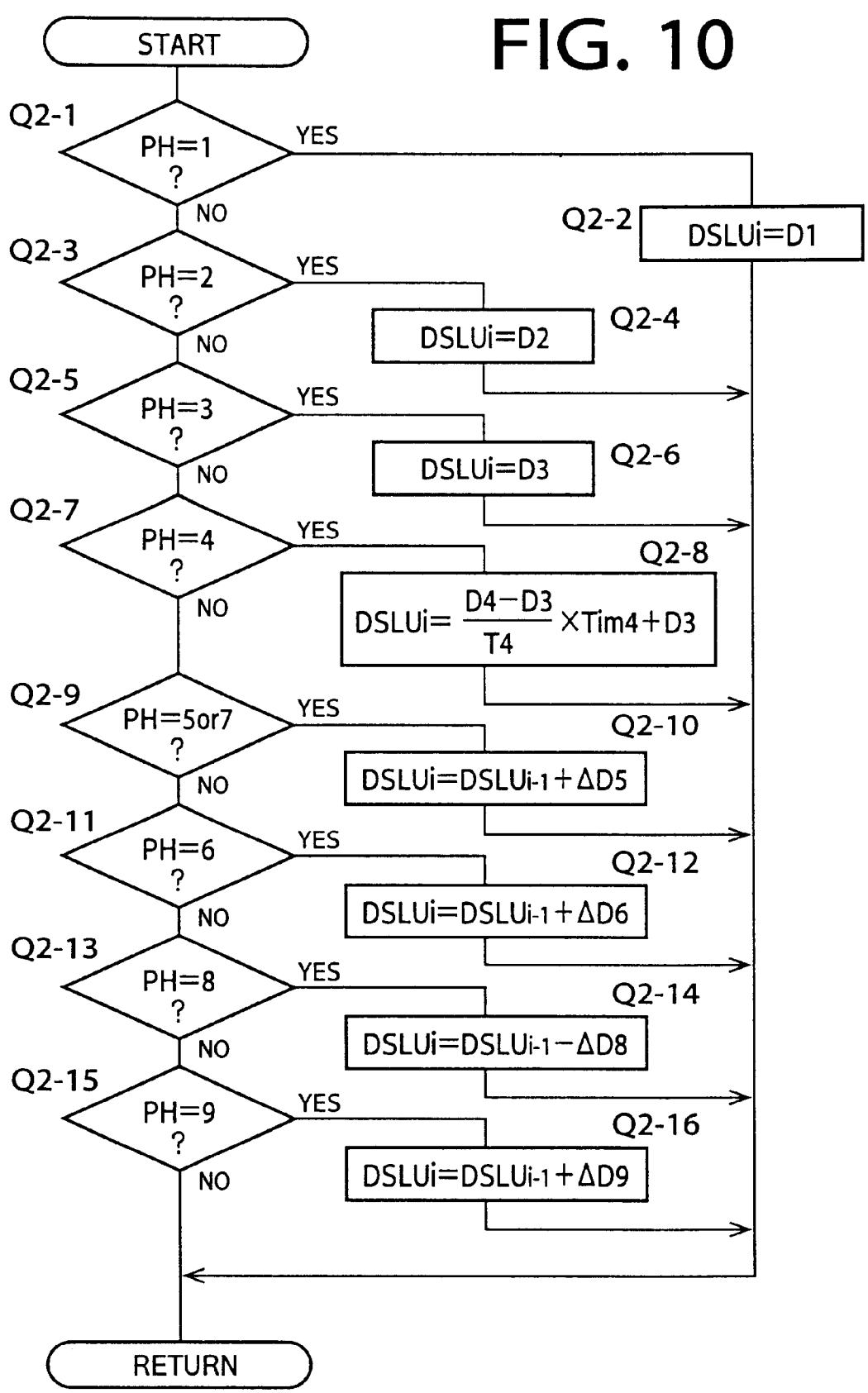
FIG. 10 is a flow chart illustrating a routine for determining a duty ratio command value DSLU for a linear solenoid valve provided to directly control the pressure in the brake B3 in each control phase determined by the routine of FIG. 9.
Figure 11:
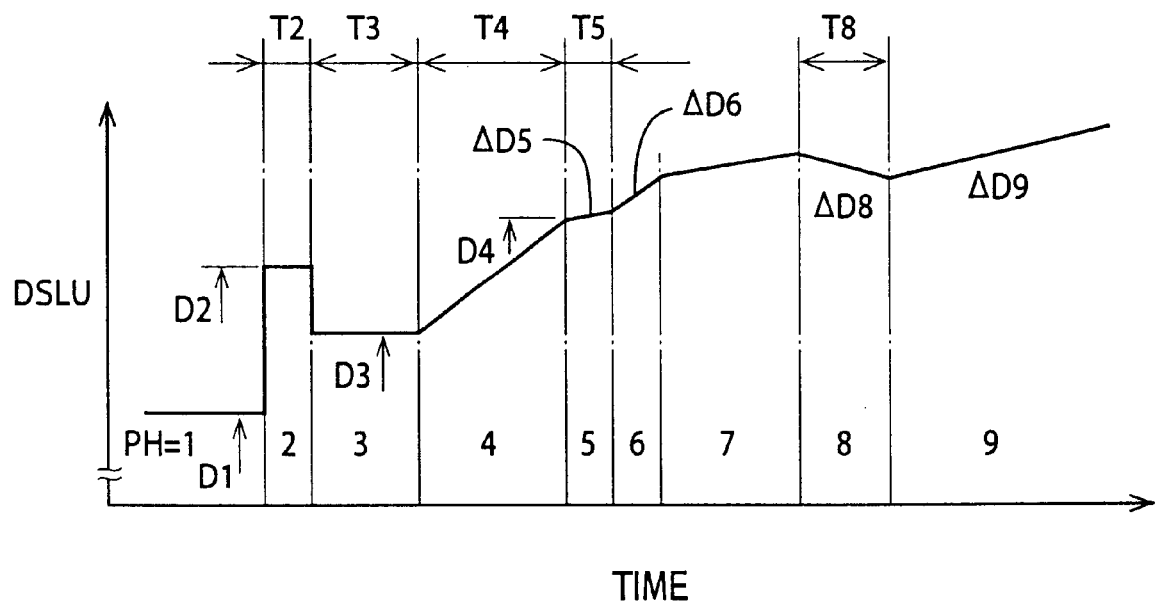
FIG. 11 is a view f or explaining a basic pattern in which the pressure of the brake B3 is directly controlled according to the routines of FIGS. 9 and 10.

The flow charts of FIGS. 9 and 10 illustrate the routines to be executed by the electronic transmission controller 178 with a predetermined cycle time, to control the linear solenoid valve SLU for directly controlling the hydraulic pressure $P_{B3}$ of the hydraulic cylinder 52 of the brake B3, when the automatic transmission 14 is commanded to be shifted up from the first-speed position "1st" to the second-speed position "2nd". The time chart of FIG. 11 indicates a basic pattern of control of the pressure $P_{B3}$, more specifically, changes of a duty ratio command value DSLU for controlling the duty ratio of the linear solenoid valve SLU, in different control phases PH1–PH9. The control system includes a memory device 188 connected to the transmission controller 178, as shown in FIG. 3. The memory device 188 stores data representative of time lengths T2–T5 and T8, predetermined values D2–D4 of the duty ratio command value DSLU, and rates of change (increments or decrements) ΔD5, ΔD6, ΔD8 and ΔD9 of the command value DSLU. The values T2–T5, T8, D2–D4, ΔD5, ΔD6, ΔD8 and ΔD9 may be either fixed values (constants), or variables which change depending upon suitable parameters such as the throttle opening angle $\theta_{TH}$ and accelerator pedal operating amount $A_{cc}$ that represent the input torque of the automatic transmission 14. In the latter case, the memory device 188 stores data maps or mathematical equations which represent the variables and which are stored in the ROM of the transmission controller 178.

Figure 12:
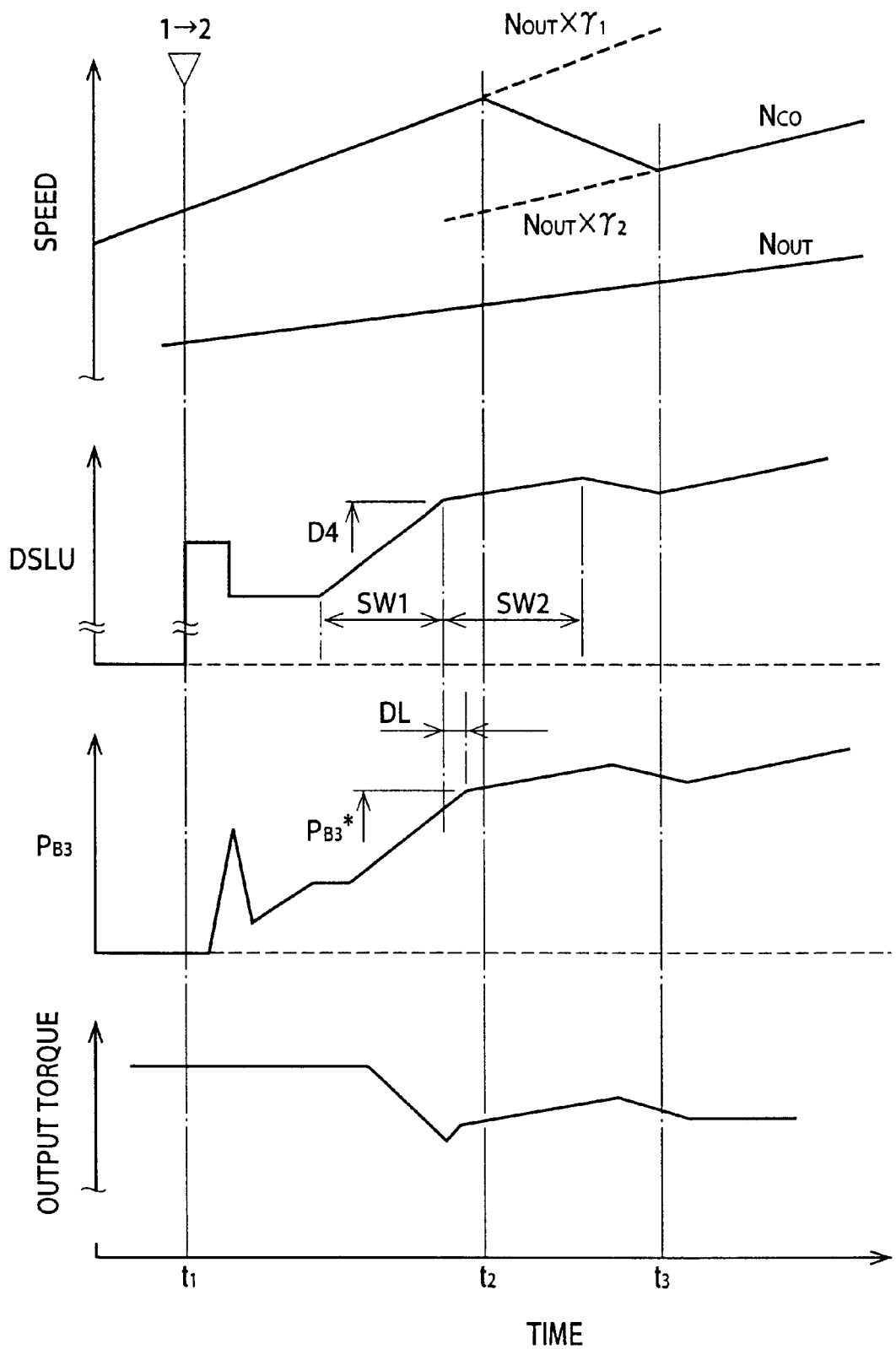
FIG. 12 is a time chart showing changes of various parameters, by way of example, when the pressure is controlled according to the routines of FIGS. 9 and 10.

The time chart of FIG. 12 shows changes of various parameters, by way of example, when the hydraulic pressure $P_{B3}$ is controlled upon the 1-2 upshift action of the automatic transmission 14. Point of time t1 indicated in FIG. 12 is a moment at which the 1-2 shift valve 70 is switched to apply the pressurized fluid to the hydraulic cylinder 52 of the brake B3 in response to a 1-2 upshift command which is applied from the transmission controller 178 to the hydraulic control device 184. The 1-2 shift valve 70 is switch by controlling the solenoid-operated valve SL2. It will be understood from the time chart of FIG. 12 that the pressure $P_{B3}$ (engaging pressure) of the brake B3 changes following the command value DSLU, with a certain delay time DL.

The routine illustrated in the flow chart of FIG. 9 is formulated to determine the present control phase PH of the duty ratio command value DSLU, and is initiated upon generation of the 1-2 upshift command at the point of time t1 (FIG. 12). The routine is initiated with step Q1-1 to determine whether a flag F1 is ON. If an affirmative decision (YES) is obtained in step Q1-1, the control flow goes to step Q1-4. Since the flag F1 is initially OFF, a negative decision (NO) is obtained when step Q1-1 is implemented for the first time, and the control flow to step Q1-2 to set the control phase PH as PH2, namely, select the control phase PH2, and reset a timer Tim2 for measuring the time lapse. Step Q1-2 is followed by step Q1-3 to turn ON the flag F1, so that the control flow goes to step Q1-4 when step Q1-1 is implemented in the next cycle of execution of the routine.

Step Q1-4 is provided to determine whether the presently selected control phase PH is PH2 while the time measured by the timer Tim2 has exceeded a predetermined threshold T2. If an affirmative decision (YES) is obtained in step Q1-4, the control flow goes to step Q1-5 to select the control phase PH3 and reset a timer Tim3 for measuring the time lapse. Like step Q1-4, subsequent steps Q1-6, Q1-8, Q1-10 and Q1-16 are formulated to check the presently selected control phase and the time lapse, for determining whether the next control phase should be selected. Like step Q1-5, subsequent steps Q1-7 and Q1-9 are formulated to select the respective control phases PH4 and PH5 as the next control phase PH and reset a timer Tim4 or Tim5 for measuring the time lapse. Steps Q1-11 and Q1-17 are formulated to select the respective control phases PH6 and PH9 as the next control phase PH.

Step Q1-12 is formulated to determine whether the presently selected control phase PH is one of the control phases PH4, PH5 and PH6, while at the same time the automatic transmission 14 is in the inertia phase. If an affirmative decision (YES) is obtained in step Q1-12, the control flow goes to step Q1-13 to select the control phase PH7. A determination in step Q1-12 as to whether the automatic transmission 14 is in the inertia phase, that is, whether the transmission 14 has entered the inertia phase is made by determining whether the following inequality (1) is satisfied or not:

$$N_{CO} < N_{OUT} \times \gamma 1 - A1 \tag{1}$$

wherein γ1 represents the speed ratio ($N_{CO}/N_{OUT}$) of the first-speed position "1st" of the automatic transmission, and A1 represents an error preventive value for preventing an erroneous determination regarding the inertia phase, due to detection errors of the input and output shaft speeds $N_{CO}$ and $N_{OUT}$ detected by the input shaft speed sensor 173 and the vehicle speed sensor 166.

Point of time t2 in the time chart of FIG. 12 is a moment at which the automatic transmission 14 has entered the inertia phase. In the example of FIG. 12, the control phase PH is changed from PH5 to PH7.

Step Q1-14 is formulated to determine whether the control phase PH7 is presently selected and the synchronization of the automatic transmission 14 is considered to be established soon. If an affirmative decision (YES) is obtained in step Q1-14, the control flow goes to step Q1-15 to select the control phase PH8 and reset a timer Tim8 for measuring the time lapse. A determination as to whether the synchronization is considered to be established soon is made by determining whether the following inequality (2) is satisfied:

$$B1 > (N_{OUT} \times \gamma 2 - N_{CO})/\Delta N_{CO} \tag{2}$$

wherein γ2 represents the speed ratio of the second-speed position "2nd" of the automatic transmission 14, and $\Delta N_{CO}$ represents a rate of change of the input shaft speed $N_{CO}$. The rate of change $\Delta N_{CO}$ may be obtained by subtracting the previous input shaft speed $N_{CO_{n-1}}$ detected in the last control cycle from the present input shaft speed $N_{CO_n}$ detected in the present control cycle. A value ($N_{OUT} \times \gamma 2 - N_{CO})/\Delta N_{CO}$ represents a time required for the post-upshift synchronizing speed ($N_{OUT} \times \gamma 2$) to be reached or established. If this required time becomes shorter than a predetermined threshold B1. The time required for the synchronization to be established may be calculated with higher accuracy, if the determination is based on a rate of change $\Delta N_{OUT}$ of the output shaft speed $N_{OUT}$, or a rate of change $\Delta (N_{OUT} \times \gamma 2)$ of the synchronizing speed ($N_{OUT} \times \gamma 2$).

As the control phase PH is selected according to the routine of FIG. 9, the duty ratio command value DSLU is controlled according to the routine of FIG. 10, in the selected control phase. The routine of FIG. 10 is initiated with step Q2-1 to determine whether the control phase PH2 is presently selected. If an affirmative decision (YES) is obtained in step Q2-1, the control flow goes to step Q2-2 to set the present duty ratio command value DSLUi of the linear solenoid valve SLU to a value D1. The value D1 is a predetermined, relatively small value (which is zero or close to zero). Since the control phase PH1 is not selected according to the routine of FIG. 9, a negative decision (NO) is obtained in step Q2-1, and the control flow goes to step Q2-3.

Step Q2-3 is provided to determine whether the control phase PH2 is presently selected. If an affirmative decision (YES) is obtained in step Q2-3, step Q2-4 is implemented to set the present duty ratio command value DSLUi to a value D2. In the control phase PH2, the linear solenoid valve SLU is controlled so as to effect a fast fill of the hydraulic cylinder 52. To this end, the value D2 is a comparatively large value, for instance, the maximum duty ratio value of the valve SLU.

If a negative decision (NO) is obtained in step Q2-3, the control flow goes to step Q2-5 to determine whether the control phase PH3 is presently selected. If an affirmative decision (YES) is obtained in step Q2-5, step Q2-6 is implemented to set the present duty ratio command value DSLUi to a value D3. In the control phase PH3, the linear control value SLU is controlled to prevent an abrupt engagement of the brake B3 due to a residual hydraulic pressure at the end of the fast fill of the hydraulic cylinder 52, that is, when the piston of the hydraulic cylinder 52 has reached the engaging stroke end. The value D2 is determined to lower the engaging pressure $P_{B3}$ of the hydraulic cylinder 52 to a predetermined low level, which is a predetermined standby pressure level plus a predetermined small value α. At the standby pressure level, the piston of the hydraulic cylinder 52 is held located close to the engaging stroke end, but the brake B3 is not in the fully engaged state.

If a negative decision (NO) is obtained in step Q2-5, the control flow goes to step Q2-7 to determine whether the control phase PH4 is presently selected. If an affirmative decision (YES) is obtained in step Q2-7, step Q2-8 is implemented to set the present duty ratio command value DSLUi to a value determined by the following equation (3):

$$DSLUi = \{(D4-D3/T4\} \times Tim4 + D3 \tag{3}$$

In the control phase PH4 initiated after the piston of the hydraulic cylinder 52 has reached the engaging stroke end, the linear control valve SLU is controlled to raise the engaging pressure $P_{B3}$ to a transition level $P_{B3}^*$ (indicated in FIG. 12) which is immediately below the level at which the automatic transmission 14 has entered the inertia phase. To this end, a feed-forward control of the duty ratio command value DSLUi is effected to rapidly raise the command value DSLUi, during a predetermined length of time T4, to the transition point value D4 which corresponds to the transition level $P_{B3}^*$ of the pressure $P_{B3}$. A sweep time SW1 indicated in FIG. 12 in relation to the command value DSLU corresponds to the control phase PH4. The time length T4 is determined taking account of the response time delay DL, so that the hydraulic pressure $P_{B3}$ has been raised to the transition level $P_{B3}^*$ corresponding to the transition point command value D4 before the automatic transmission 14 has entered the inertia phase. The transition point command value D4 and the time length T4 are represented by suitable mathematical equations or data maps stored in the ROM of the transmission controller 178. These equations and data maps include suitable parameters such as the operating amount $A_{cc}$ of the accelerator pedal 140 or the opening angle $\theta_{TH}$ of the throttle valve 156, which reflects the input torque of the automatic transmission 14.

Figure 13A:
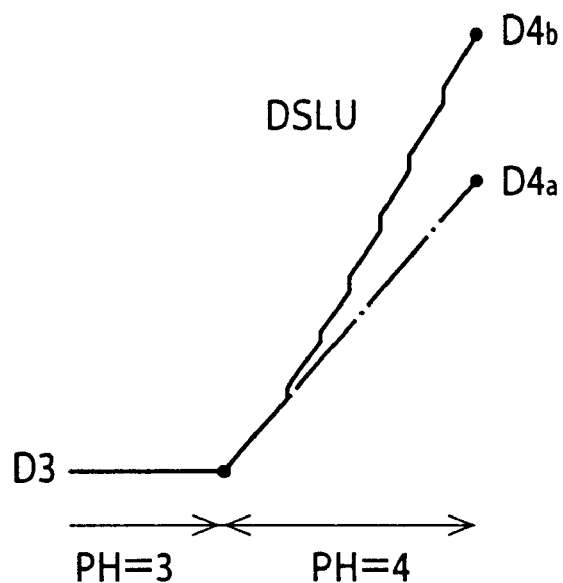
FIGS. 13A and 13B are views showing a change of the throttle valve opening angle $\theta_{TH}$ upon determination of the duty ratio command value DSLUi in step Q2-8 of the routine of FIG. 10, FIG. 13A indicating a change of the command value DSLU, while FIG. 13B indicating a relationship between a transition point command value D4 and the throttle valve opening angle $\theta_{TH}$.

The present duty ratio command value DSLUi in the control phase PH4 is calculated by obtaining the transition point command value D4 and solving the above equation (3) using the obtained value D4. The transition point command value D4 is obtained on the basis of the throttle opening angle $\theta_{TH}$, in each cycle of execution of the routine of FIG. 10, in order to adequately control the pressure $P_{B3}$ of the hydraulic cylinder 52 of the brake B3, irrespective of a change in the operating amount $A_{cc}$ of the accelerator pedal 150. FIG. 13A shows an example of a change of the duty ratio command value DSLU where the throttle opening angle $\theta_{TH}$ is changed from $\theta_{THa}$ to $\theta_{THb}$ in the control phase PH4. Initially, the transition point command value D4a corresponding to the initial throttle opening angle $\theta_{TH}$ is used to calculate the present duty ratio command value DSLUi, as indicated by broken line. As the throttle opening angle $\theta_{TH}$ is increased, the transition point command value D4 is increased. When the throttle opening angle $\theta_{TH}$ has been increased to $\theta_{THb}$, the transition point command value D4b is used to calculate the present duty ratio command value DSLUi, as indicated by solid line. According to this arrangement, the duty ratio command value DSLU can be increased to the adequately determined transition point value D4, even where the throttle opening angle $\theta_{TH}$ is changed.

Figure 13B:
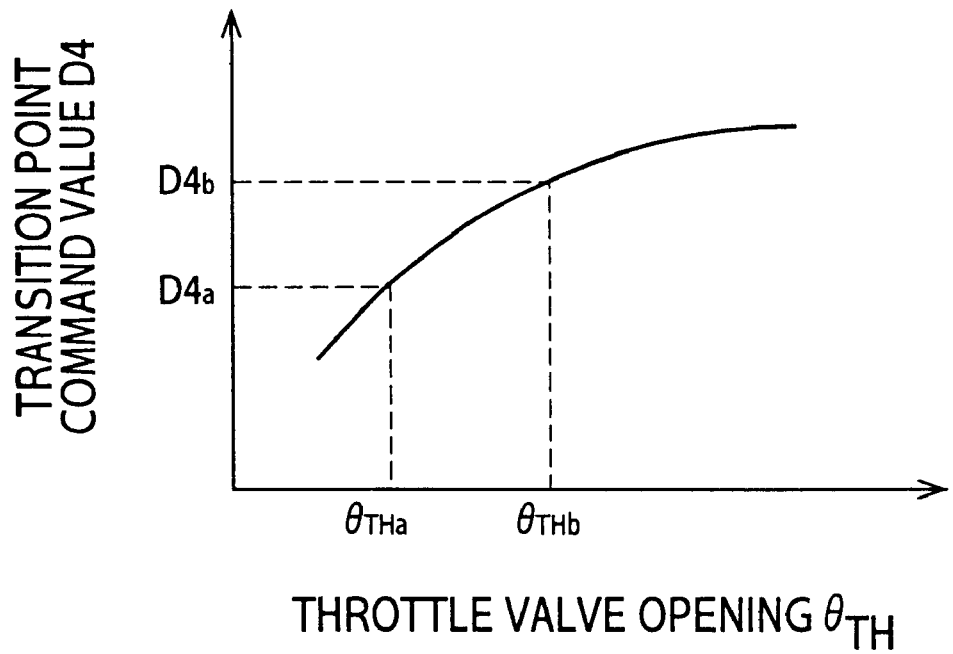

FIG. 13B shows an example of a data map used to determine the transition point command value D4 on the basis of the throttle opening angle $\theta_{TH}$. When the accelerator pedal 150 is depressed, the throttle opening angle $\theta_{TH}$ is accordingly changed. However, an actual increase in the output of the engine 10 is delayed with respect to an increase in the throttle opening angle $\theta_{TH}$. In this respect, it is desirable to compensate the throttle opening angle $\theta_{TH}$ by a suitable smoothing amount corresponding to the delay of the engine output increase, so that the transition point command value D4 is calculated on the basis of the compensated throttle opening angle.

If a negative decision (NO) is obtained in step Q2-7, the control flow goes to step Q2-9 to determine whether the presently selected control phase PH is PH5 or PH7. If an affirmative decision (YES) is obtained in step Q2-9, the control flow goes to step Q2-10 to set the present duty ratio command value DSLUi to a value determined by the following equation (4):

$$DSLUi=(DSLUi-1+\Delta D5) \quad (4)$$

In the control phases PH5 and PH7, a feed-forward control of the present duty ratio command value DSLUi is effected to increase the present duty ratio command value DSLUi at a predetermined rate $\Delta D5$ which is lower than the rate at which the command value DSLUi is increased in the control phase PH4, so that the input shaft speed $N_{CO}$ can be changed at a rate as high as possible while preventing a shifting shock of the automatic transmission 14 due to a change in the input shaft speed $N_{CO}$. In the above equation (4), the value DSLUi−1 is the duty ratio command value obtained in the last cycle of execution of the routine of FIG. 10. The rate $\Delta D5$ may be considered an increment of the duty ratio command value DSLUi for each cycle of execution of the routine of FIG. 10. In the example of FIG. 12 wherein the control phase PH5 established before the automatic transmission 14 has entered the inertia phase is followed by the control phase PH7, a sweep time SW2 corresponds to the control phase PH5 (before the point of time t2) and the control phase PH7 (after the point of time t2).

If a negative decision (NO) is obtained in step Q2-9, the control flow goes to step Q2-11 to determine whether the control phase PH6 is presently selected. If an affirmative decision (YES) is obtained in step Q2-11, the control flow goes to step Q2-12 to set the present duty ratio command value DSLUi to a value determined by the following equation (5):

$$DSLUi=DSLUi-1+\Delta D6 \quad (5)$$

It will be understood from step Q1-10, Q1-11 and Q1-12 of FIG. 9 that the control phase PH6 is selected where the automatic transmission 14 has not entered the inertia phase even after the predetermined time length T5 has passed after the moment of selection of the control phase PH5. In the control phase 6, a feed-forward control of the present duty ratio command value DSLUi is effected to increase the duty ratio command value DSLUi at a rate $\Delta D6$ higher than the rate $\Delta D5$ used in the control phase PHS, so that the automatic transmission 14 enters the inertial phase as soon as possible. The like the rate $\Delta D5$, the rate $\Delta D6$ may be considered to be an increment of the duty ratio command value DSLUi. However, the control phase PH6 may be omitted.

If a negative decision (NO) Is obtained in step Q2-11, the control flow goes to step Q2-13 to determine whether the control phase PH8 is presently selected. If an affirmative decision (YES) is obtained in step Q2-13, the control flow goes to step Q2-14 to set the present duty ratio command value DSLUi to a value determined by the following equation (6):

$$DSLUi=DSLUi-1+\Delta D8 \quad (6)$$

In the control phase PH8, a feed-forward control of the command value DSLUi is effected to reduce the command value DSLUi at a predetermined rate $\Delta D8$, so as to prevent an increase of the output torque when the input shaft speed $N_{CO}$ has approached the post-upshift synchronization speed, namely, in the terminal part of the engaging action of the brake B3. The rate $\Delta D8$ may be considered to be a decrement of the command value DSLUi.

If a negative decision (NO) is obtained in step Q2-13, the control flow goes to step Q2-15 to determine whether the control phase PH9 is presently selected. If an affirmative decision (YES) is obtained in step Q2-15, the control flow goes to step Q2-16 to set the present duty ratio command value DSLUi to a value determined by the following equation (7):

$$DSLUi=DSLUi-1+\Delta D9 \quad (7)$$

In the control phase PH9, a feed-forward control of the duty ratio command value DSLUi is effected to increase the command value DSLUi at a predetermined rate $\Delta D9$, for raising the hydraulic pressure $P_{B3}$ to the line pressure PL, after the input shaft speed $N_{CO}$ has reached the synchronizing speed and after the upshift of the automatic transmission 14 from the position "1" to the position "2" is completed with full engagement of the brake B3. In FIG. 13, point of time t3 is a moment at which the input shaft speed $N_{CO}$ has reached the synchronizing speed and the brake B3 has been substantially fully engaged. Namely, the automatic transmission 14 has been shifted up from the first-speed position "1st" to the second-speed position "2nd" at the point of time t3. The control phase PH9 is selected at a point almost coincident with the point of time t3. Like the rates $\Delta D5$ and $\Delta D6$, the rate $\Delta D9$ may be considered to be an increment of the command value DSLUi.

In the present embodiment which has been described above, the feed-forward control of the duty ratio command value DSLU is effected in the torque phase (corresponding to the sweep time SW1) and in the inertia phase (corresponding to the sweep time SW2) of the automatic transmission 14, to control the rates of change of the hydraulic pressure $P_{B3}$ of the hydraulic cylinder 52 in the torque and inertia phases. That is, the feed-forward control of the duty ratio of the linear solenoid valve SLU is effected in the torque phase as well as in the inertia phase, so that the shifting shock of the transmission 14 due to the response delay DL and the deterioration of the friction members of the brake B3 can be reduced in the present arrangement, as compared with an arrangement wherein the rate of change of the hydraulic pressure $P_{B3}$ is controlled after the initiation of the inertia phase is detected on the basis of a change in the input shaft speed $N_{CO}$, or an arrangement wherein a feedback control of the hydraulic pressure is effected in the inertia phase so that the input shaft speed $N_{CO}$ is changed at a predetermined rate. If the rate of increase of the hydraulic pressure $P_{B3}$ in the torque phase were lowered for the purpose of reducing the influence of the response delay DL, the time duration of the torque phase would be increased, undesirably deteriorating the smoothness of the shifting action of the automatic transmission 14 and the durability of the friction members of the brake B3. The present embodiment makes it possible to control the hydraulic pressure $P_{B3}$ without lowering the rate of increase of the pressure $P_{B3}$ in the torque phase and without adverse influences of the response delay DL.

Figure 14:
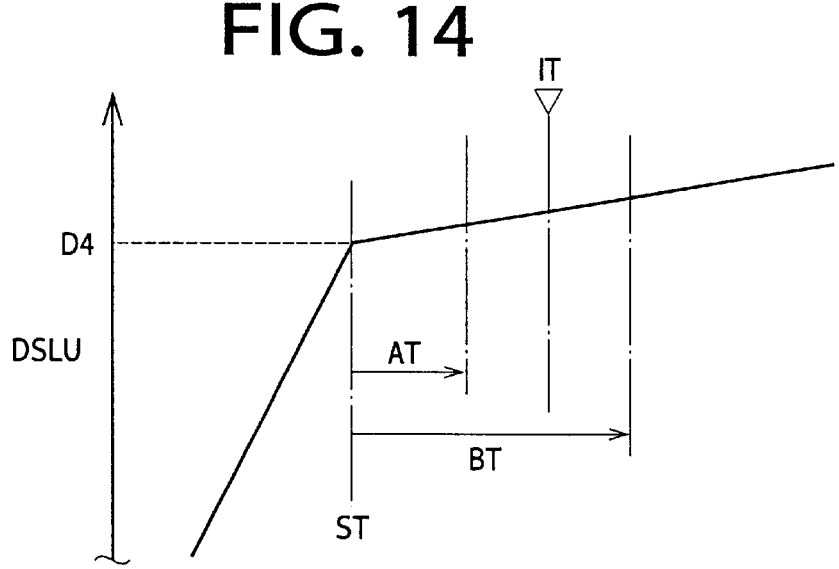
FIG. 14 is a view for explaining a learning compensation of the transition point command value D4 in the direct control of the pressure of the brake B3 according to the routines of FIGS. 9 and 10.

Further, the above-indicated transition point command value D4 corresponding to the transition level $P_{B3}$ * of the hydraulic pressure $P_{B3}$ is subjected to a learning compensation, so that the rate of change of the hydraulic pressure $P_{B3}$ in the torque phase corresponding to the sweep time SW1 can be switched to that in the inertia phase corresponding to the sweep time SW2, at an appropriate timing irrespective of a chronological change of the characteristics of the power transmitting system or a difference in the characteristics among power transmitting systems of the individual vehicles. Described more specifically, the data map which is stored in the memory device 188 and used to determine the transition point command value D4 on the basis of the throttle opening angle $\theta_{TH}$ is updated or compensated so that the automatic transmission 14 enters the inertia phase at a point of time IT, as indicated in FIG. 14, wherein "ST" represents a point of time at which the duty ratio command value DSLU has been increased to the transition point value D4, and "AT" and "BT" respectively represent permissible shortest and longest times from the point of time ST, during which the inertia phase is initiated. That is, the learning compensation of the transition point command value D4 permits the automatic transmission 14 to enter the inertia phase at the point of time IT which is intermediate between the moments of expiration of the permissible shortest and longest times AT and BT from the point of time ST. The point of time ST is a moment at which the control in the control phase PH4 is terminated and the affirmative decision (YES) is obtained in step Q1-8, while the point of time IT is a moment at which the affirmative decision (YES) is obtained in step Q1-12.

The learning compensation of the transition point command value D4 will be described more specifically by reference to FIGS. 15A, 15B and 15C.

Figure 15A:
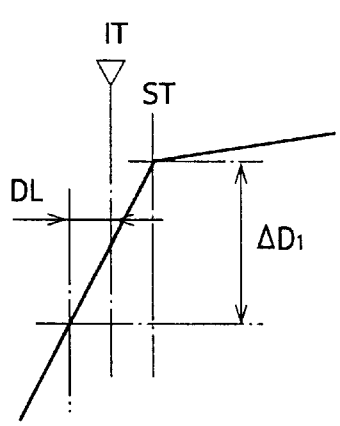
FIGS. 15A, 15B and 15C are views for explaining details of the learning compensation of FIG. 14.

In the case of FIG. 15A, the automatic transmission 14 has entered the inertia phase prior to the point of time ST. In this case, the compensating amount (a negative value in this case) of the transition point command value D4 is calculated according to a predetermined mathematical equation, on the basis of the hydraulic pressure $P_{B3}$ at the point of time IT as adjusted by the response delay DL, that is, on the basis of a difference ΔD1 between the present transition point command value D4 and the duty ratio command value DSLU at a point of time which is prior to the point of time IT by the response delay DL. The data map stored in the memory device 188 to obtain the transition point command value D4 on the basis of the throttle opening angle $\theta_{TH}$ is compensated on the basis of the calculated compensating amount. The mathematical equation may be formulated such that the absolute value of the compensating amount (negative value in this case) increases with an increase in the difference ΔD1.

Figure 15B:
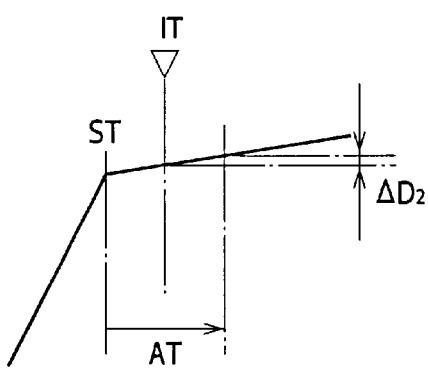

In the case of FIG. 15B, the automatic transmission 14 has entered the inertia phase at a point of time between the point of time ST and the moment of expiration of the permissible shortest time AT. In this case, the compensating amount (a negative value in this case) of the transition point command value D4 is calculated according to a predetermined mathematical equation, on the basis of a difference ΔD2 between the command values DSLU at the point of time IT and at the moment of expiration of the permissible shortest time AT. On the basis of the calculated compensating amount, the data map stored in the memory device 188 to obtain the transition point command value D4 on the basis of the throttle opening angle $\theta_{TH}$ is compensated. The mathematical equation may be formulated such that the absolute value of the compensating amount increases with an increase in the difference ΔD2.

Figure 15C:
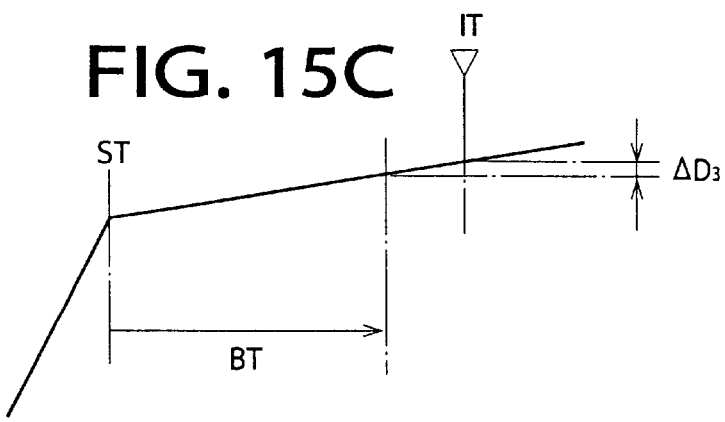

In the case of FIG. 15C, the automatic transmission 14 has entered the inertia phase at a point of time after the moment of expiration of the permissible longest time BT. In this case, the compensating amount (a positive value in this case) of the transitional point command value D4 is compensated according to a predetermined mathematical equation, on the basis of a difference ΔD3 between the command values DSLU at the moment of expiration of the permissible longest time BT and the point of time IT. On the basis of the calculated compensating amount, the data map stored in the memory device 188 to obtain the transition point command value D4 on the basis of the throttle opening angle $\theta_{TH}$ is compensated. The mathematical equation may be formulated such that the compensating amount (positive value) increases with an increase in the difference ΔD3. It is noted that two different mathematical equations may be used to calculate the compensating amount, depending upon whether the control phase PH6 has been selected or not.

Where the point of time IT at which the automatic transmission 14 has entered the inertia phase is intermediate between the moments of expiration of the permissible shortest and longest times AT and BT from the point of time ST at which the present transition point command value D4 has been reached, the transition point command value D4 is not compensated, that is, the data map is not compensated.

The learning compensation of the transition point command value D4 effected as described above assures that the automatic transmission 14 enters the inertia phase at the appropriate point of time IT with respect to the point of time ST, irrespective of a difference in the characteristics among the power transmitting systems of the individual vehicles or a chronological change of the characteristics of the power transmitting system of each vehicle, which difference or chronological change would otherwise cause a variation in the point of time IT at which the inertia phase is established, unfavorably resulting in a shifting shock of the transmission 14 and deterioration of the friction members of the brake B3.

Further, the shifting shock of the automatic transmission 14 while the vehicle is coasting with the accelerator pedal 150 being placed in the non-operated position can be avoided, irrespective of the delayed shifting action, by lowering the hydraulic pressure $P_{B3}$ on the basis of the above-indicated difference ΔD1, to a level at which the brake B3 is substantially released or disengaged.

It is also noted that the appropriate standby hydraulic pressure at which the piston of the hydraulic cylinder 52 of the brake B3 can be kept close to the engaging stroke end can be obtained by learning, by subtracting the pressure value corresponding to the input torque of the automatic transmission 14, from the transition point hydraulic pressure $P_{B3}$* (corresponding to the transition point command value D4) when the throttle valve 156 is placed in the substantially fully closed position.

Since the present arrangement is effective to reduce a variation in the point of time IT at which the automatic transmission 14 enters the inertia phase, the use of the input shaft speed sensor and the vehicle speed sensor makes it possible to detect the transition from the torque phase to the inertia phase, with high accuracy, so that the detection of the transition can be utilized for various controls, for instance, for reducing the torque immediately before the initiation of the inertia phase. Namely, the present arrangement does not require an exclusive sensor for detecting the torque phase, leading to a reduced cost of manufacture of the control apparatus for the power transmitting system.

In addition, the learning compensation to optimize the transition point command value D4 (transition level $P_{B3}{}^*$ of the hydraulic pressure $P_{B3}$) makes it possible to reduce shocks or variations when the optimized command value D4 is used to effect other controls, for example, a control to be performed when the operating amount $A_{cc}$ of the accelerator pedal 150 is changed during a shifting action of the transmission 14, or when the brake B3 is engaged after it is released.

It is possible to effect learning compensation of the sweep time T4 while holding constant the rate of increase of the hydraulic pressure $P_{B3}$ (duty ratio command value DSLU) in the control phase PH4, or effect learning compensation of the rate of increase of the hydraulic pressure $P_{B3}$ (command value DSLU) while holding constant the sweep time T4.

Figure 17:
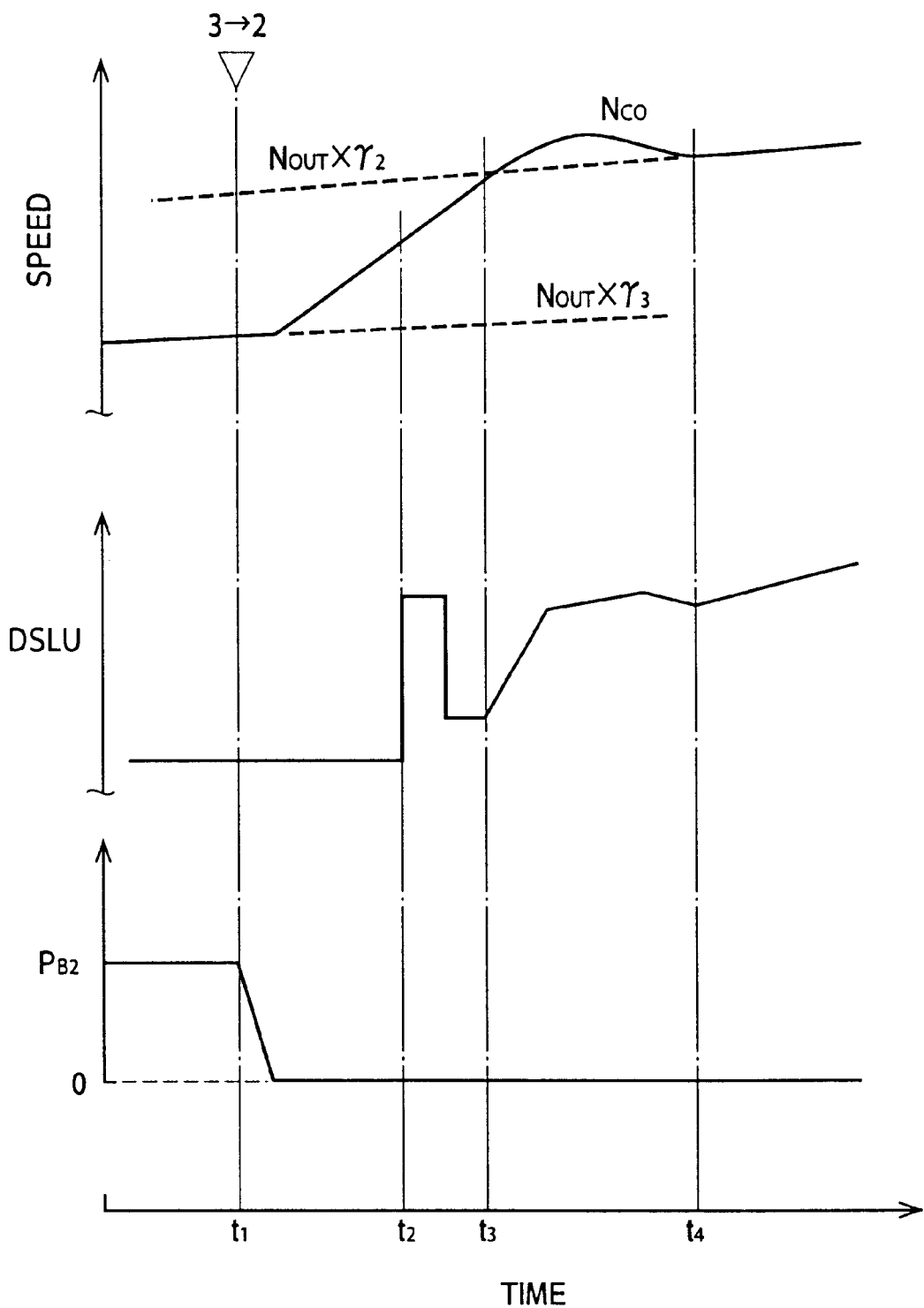
FIG. 17 is a time chart showing changes of various parameters, by way of example, when the downshift is controlled according to the routine of FIG. 16.
Figure 18:
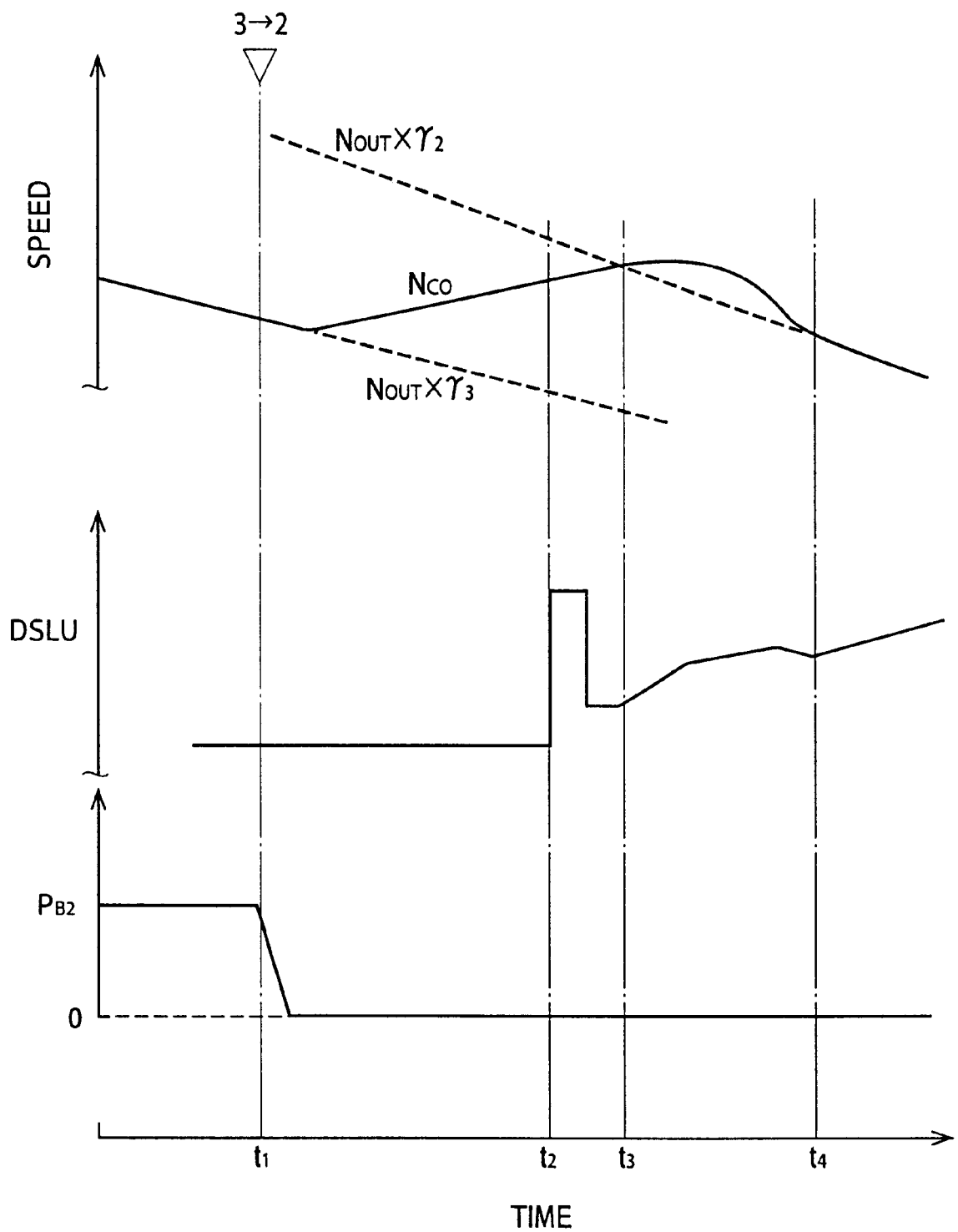
FIG. 18 is a time chart showing changes of various parameters, by way of example, when the downshift is effected according to the routine of FIG. 16 during coasting of the vehicle.

The flow chart of FIG. 16 illustrates a routine to be executed by the transmission controller 178 when the automatic transmission 14 is shifted down from the third-speed position "3rd" to the second-speed position "2nd". The time chart of FIG. 17 shows examples of changes of the input shaft speed $N_{CO}$, duty ratio command value DSLU, etc. when the 3-2 downshift of the automatic transmission 14 is effected. In the example of FIG. 17, the 3-2 downshift is effected while the vehicle is running in a POWER-ON state with a drive force being transmitted to the drive wheels with the accelerator pedal 150 held depressed. In the example of FIG. 18, the 3-2 downshift is effected while the vehicle is coasting in a POWER-OFF state at a decreasing speed with the accelerator pedal 150 held in the non-operated position.

The routine of FIG. 16 is initiated with step R1 to determine whether the 3-2 downshift of the automatic transmission 14 should be effected. This determination is made on the basis of the detected vehicle speed V and throttle opening angle $\theta_{TH}$ and according to the downshift boundary lines shown in FIG. 8, or on the basis of the manual operation of the shift lever 172 or the downshift switch 186a. If an affirmative decision (YES) is obtained in step R1, the control flow goes to step R2 wherein the 2-3 shift valve 71 is switched, and the brake B2 is released with the hydraulic cylinder 54 being drained. Step R2 is followed by step R3 wherein the pressurized fluid is supplied to the hydraulic cylinder 52 of the brake B3, and the hydraulic pressure $P_{B3}$ is directly controlled by the linear solenoid valve SLU, to effect a so-called "overshoot engagement" of the brake B3 such that the input shaft speed $N_{CO}$ is first raised above the synchronizing speed ($N_{OUT}\times\gamma2$), and is then lowered down to the synchronizing speed ($N_{OUT}\times\gamma2$). In step R2, the 2-3 shift valve 71 is switched by controlling the solenoid-operated valve SL1.

Point of time t1 in FIGS. 17 and 18 is a moment at which a determination that the 3-2 downshift should be effected is made, and point of time t3 is a moment at which the input shaft speed $N_{CO}$ has exceeded the synchronizing speed ($N_{OUT}\times\gamma2$). Further, point of time t4 is a moment at which the input shaft speed $N_{CO}$ has been lowered down to be substantially equal to the synchronizing speed ($N_{OUT}\times\gamma2$) and at which the brake B3 has been substantially fully engaged. Namely, the 3-2 downshift is substantially completed at the point of time T4. As in the above-described 1-2 upshift, the hydraulic pressure $P_{B3}$ of the brake B3 changes substantially following a change in the duty ratio command value DSLU representative of the duty ratio of the linear solenoid valve SLU, with a certain time delay (not shown in FIGS. 17 and 18). $\gamma3f$ in FIGS. 17 and 18 represents the speed ratio of the third-speed position "3rd" of the automatic transmission 14.

The 3-2 downshift control illustrated in the flow chart of FIG. 16 is effected according to the principle of the present invention. It will be understood that the brake B3 constitutes a frictional coupling device, while the hydraulic cylinder 52 constitutes a hydraulic cylinder for operating the frictional coupling device. It will also be understood that the linear solenoid valve SLU for directly controlling the hydraulic pressure $P_{B3}$, and the B3-control valve 78 constitute a pressure regulating device, while the hydraulic pressure $P_{B3}$ and the duty ratio command value DSLU correspond to an engaging force of the frictional coupling device (brake B3). It will further be understood that a portion of the electronic transmission controller 178 assigned to implement step R3 functions as overshoot engagement control means for effecting an overshoot engagement of the frictional coupling device. Downshift controls similar to the 3-2 downshift control described above are effected for a 5-2 downshift and a 4-2 downshift of the automatic transmission 14, after the frictional coupling device for establishing the fifth-speed or fourth-speed position "5th", "4th" is rapidly released.

Figure 19:
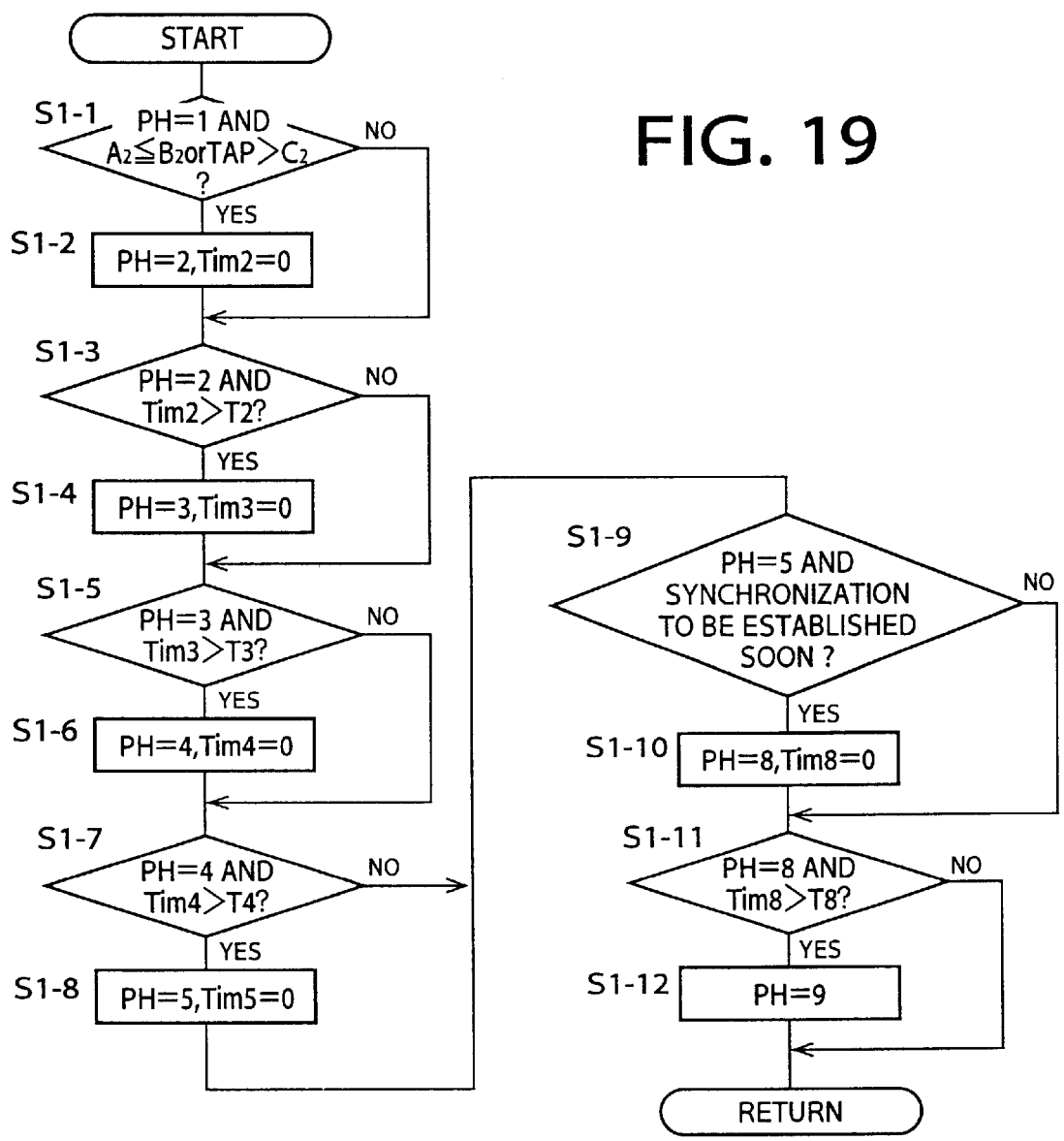
FIG. 19 is a flow chart illustrating details of step R3 of FIG. 16 wherein the control phase PH for direct control of the pressure of the brake B3 is determined.
Figure 20:
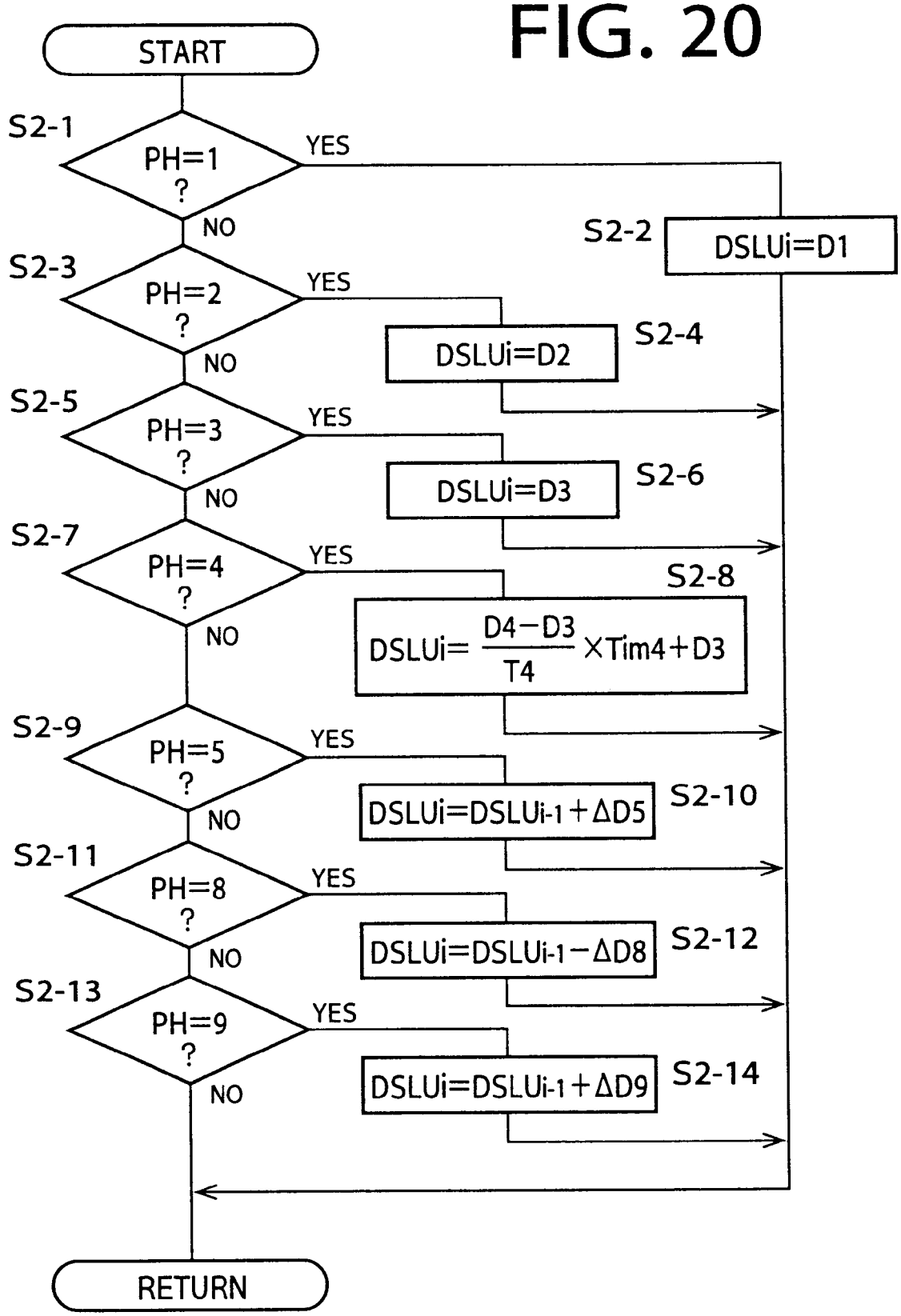
FIG. 20 is a flow chart illustrating a routine for determining the duty ratio command value DSLU of a linear solenoid valve for direct control of the pressure of the brake B3 in each control phase PH determined by the routine of FIG. 19.
Figure 21:
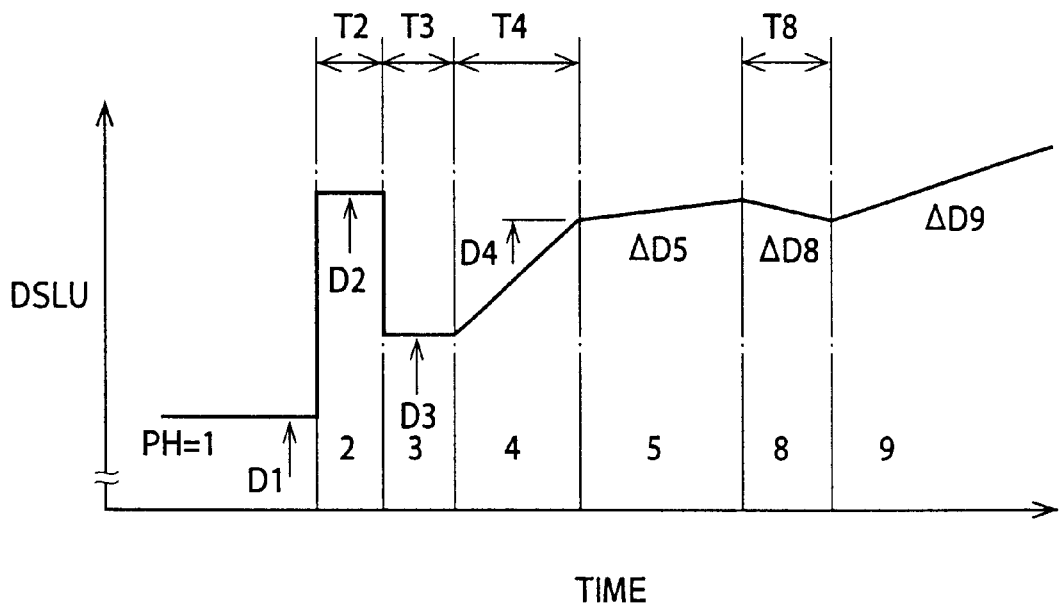
FIG. 21 is a time chart for explaining a basic pattern in which the pressure of the brake B3 is directly controlled according to the routine of FIGS. 19 and 20.

In the hydraulic pressure control for the overshoot engagement of the brake B3 in step R3 described above, a feed-forward control of the duty ratio command value DSLU is effected in a control pattern which is basically similar to that of the direct control of the pressure $P_{B3}$ for the 1-2 upshift. The flow charts of FIGS. 19 and 20 show the details of step R3, illustrating routines corresponding to those of FIGS. 9 and 10. The routines of FIGS. 19 and 20 are executed with a predetermined cycle time. The time chart of FIG. 21 shows a basic control pattern of the duty ratio command value DSLU for the overshoot engagement of the brake B3. It will be understood from FIGS. 19–21 that the control phases PH6 and PH7 provided in the 1-2 upshift control described above are not provided in the present 3-2 downshift control. The time lengths T2–T4 and T8, the preset values D1–D4 of the duty ratio command value DSLU, and the rates of change ΔD5, ΔD8 and ΔD9 of the duty ratio command value DSLU are stored in the memory device 188. In the present embodiment, the set of data stored for the 1-2 upshift are used for the 3-2 downshift. However, another set of data exclusively used for the 3-2 downshift may be stored in the memory device 188. It is also noted that the control pattern considerably different from that for the 1-2 downshift may be used for the 3-2 downshift.

The routine of FIG. 19 is initiated with step S1-1 to determine a point of time at which the supply of the pressurized fluid to the brake B3 is initiated, that is, to determine whether the supply of the pressurized fluid to the hydraulic cylinder 52 of the brake B3 should be initiated or not. Namely, a first time A2 required for the input shaft speed $N_{CO}$ to reach the synchronizing speed ($N_{OUT}\times\gamma2$) of the second-speed position "2nd" is obtained, and is compared with a predetermined second time B2 required for the piston of the hydraulic cylinder 52 to reach the engaging stroke end. The second time B2 is stored in the memory device 188. If the first time A2 has been become equal to or shorter than the second time B2, it means that the input shaft speed $N_{CO}$ has substantially reached or exceeded the synchronizing speed ($N_{OUT}\times\gamma2$). In this case, it is determined that the supply of the pressurized fluid to the brake B3 should be initiated.

Described in detail, step S1-1 is provided to 1determine whether the first time A2 has become equal to or shorter than the second time B2. The first time A2 can be calculated according to the following equation (8) which includes a rate of change $\Delta N_{CO}$ of the input shaft speed $N_{CO}$. This rate of change $\Delta N_{CO}$ can be obtained by subtracting the previous input shaft speed $N_{COn-1}$ detected in the last cycle of execution of the routine, from the present input shaft speed $N_{COn}$ detected in the present cycle.

$$A2=(N_{OUT}\times\gamma 2-N_{CO})/\Delta N_{CO} \qquad (8)$$

The above equation (8) is based on an assumption that the vehicle speed V, that is, the synchronizing speed ($N_{OUT}\times\gamma 2$) is held substantially constant. Where the vehicle speed V varies as in a downshift of the automatic transmission 14 during coasting of the vehicle, it is desirable to change the synchronizing speed ($N_{OUT}\times\gamma 2$) according to the following equation (9), which includes a rate of change $\Delta(N_{OUT}\times\gamma 2)$ of the synchronizing speed ($N_{OUT}\times\gamma 2$).

$$A2=(N_{OUT}\times\gamma 2-N_{CO})/\{\Delta N_{CO}-\Delta(N_{OUT}\times\gamma 2)\} \qquad (9)$$

The second time B2 is a time required for the piston of the hydraulic cylinder 52 to reach its engaging stroke end where the pressure of the pressurized fluid to be supplied to the hydraulic cylinder 52 is controlled in the control pattern indicated in FIG. 21. Since this second time B2 varies with the temperature of the fluid, data for the second time B2 are stored in the memory device 188, in relation to the fluid temperature. Since the second time B2 is equal to a sum of the preset times T2 and T3 indicated in FIG. 21, this sum may be used as the second time B2. In the case of the downshift during coasting of the vehicle shown in FIG. 18, a suitable time is subtracted from the second time B2, and the obtained difference is compared with the first time A2, so that the piston of the hydraulic cylinder 52 reaches the engaging stroke end only after the input shaft speed $N_{CO}$ has reached the synchronizing speed ($N_{OUT}\times\gamma 2$). Whether the downshift takes place during coasting of the vehicle or not can be determined by determining whether the throttle valve 156 is in the fully closed position or not, or whether the idling detector switch of the throttle sensor 164 is in the ON state or not. The above-indicated difference may be used for downshifts other than the coasting downshift, so that the piston of the hydraulic cylinder 52 reaches the engaging stroke end only after the input shaft speed $N_{CO}$ has reached the synchronizing speed ($N_{OUT}\times\gamma 2$). The memory device 188 storing the second time B2 is not cleared even when power is removed from the memory device 188. The RAM or ROM of the transmission controller 178 may be used in place of the memory device 188. It will be understood that the memory device 188 functions as a time data memory storing the second time B2.

It is noted that the actual change of the hydraulic pressure $P_{B3}$ of the hydraulic cylinder 52 is delayed with respect to a change in the duty ratio command value DSLU of the linear solenoid valve SLU, so that the determination in step S1-1 is made, with this delay taken into account. Further, an affirmative decision (YES) is obtained in step S1-1 when the above-indicated condition for initiating the supply of the pressurized fluid to the hydraulic cylinder 52 is satisfied, only while the control phase PH1 is presently selected. Since the control phase PH is initially set to PH1, the control phase PH1 is always selected when step S1-1 is implemented. In the control phase PH1, the command value D1 is relatively small, so that the piston of the hydraulic cylinder 52 is not moved by a large distance toward the engaging stroke end in the control phase 1. When a throttle opening command value TAP representative of the throttle opening angle $\theta_{TH}$ is larger than a threshold C2, the affirmative decision (YES) is obtained in step S1-1 even when the first time A2 is longer than the second time B2. The threshold C2 changes with the vehicle speed V. When the vehicle speed V is low enough to cause a downshift of the automatic transmission 14 to the second-speed position "2nd", the threshold C2 is zeroed, so that the affirmative decision (YES) is obtained in step S1-1 as soon as the routine of FIG. 19 is initiated.

When the affirmative decision (YES) is obtained in step S1-1, the control flow goes to step S1-2 to select the control phase PH2, so that the duty ratio command value DSLU of the linear solenoid valve SLU is set to D2 in step S2-4 in the routine of FIG. 20, to effect the fast filling of the hydraulic cylinder 52 with the pressurized fluid. Point of time t2 indicated in FIGS. 17, and 18 is a moment at which the affirmative decision (YES) is obtained in step S1-1 and the control phase PH2 is selected. It will be understood that a portion of the electronic transmission controller 178 assigned to implement step S1-1 functions as timing determining means for determining whether the supply of the pressurized fluid to the hydraulic cylinder 52 should be initiated.

Step S1-2 is followed by steps S1-3 through S1-12, which are similar to steps Q1-4 through Q1-9, and steps Q1-14 through Q1-17 of the routine of FIG. 9, so that the control phase PH is sequentially changed from PH3 to PH9. As the routine of FIG. 19 is executed, steps S2-1 through S2-14 of the routine of FIG. 20 are implemented to control the duty ratio command value DSLU in each of the selected control phases PH, as in steps Q2-1 through Q2-10, and Q2-13 through Q2-16 of the routine of FIG. 10. In the control phase PH4, the command value DSLU is increased toward the transition point command value D4, so that the drive force of the vehicle in the second-speed position "2nd" is rapidly increased with the rate of increase of the hydraulic pressure $P_{B3}$ being increased with an increase in the command value DSLU, in the case of the 3-2 downshift of FIG. 17 of the automatic transmission 14 during coasting of the vehicle in the POWER-ON state, for example. The transition point command value D4 is the same as used in the 1-2 upshift described above, and is subjected to the learning compensation from time to time. In the 3-2 downshift of FIG. 18 during coasting of the vehicle, too, the transition point command value D4 used for the upshift when the throttle opening angle $\theta_{TH}$ is extremely small may be used.

With the routine of FIG. 20 executed, the piston of the hydraulic cylinder 52 of the brake B3 has reached the engaging stroke end, and the brake B3 initiates the generation of the engaging force, when the input shaft speed $N_{CO}$ has substantially reached or exceeded the synchronizing speed ($N_{OUT}\times\gamma 2$), as indicated in FIGS. 17 and 18. Subsequently, the engaging force is increased so that the input shaft speed $N_{CO}$ is controlled to smoothly approach the synchronizing speed ($N_{OUT}\times\gamma 2$). In the case of the downshift of FIG. 18 during coasting of the vehicle, the piston of the hydraulic cylinder 52 has reached the engaging stroke end, and the brake B3 initiates the generation of the engaging force, when the input shaft speed $N_{CO}$ has reached the synchronizing speed ($N_{OUT}\times\gamma 2$). In the case of the coasting downshift of FIG. 18, the input shaft speed $N_{CO}$ is increased as the brake B2 is released, because the engine speed $N_E$ is higher the input shaft speed $N_{CO}$. In this case, the downshift of the automatic transmission 14 from the third-speed position "3rd" to the second-speed position "2nd" is initiated while a relatively small drive force is produced in the third-speed position "3rd".

The input torque of the automatic transmission 14 may be reduced by restricting the output torque of the engine 10 when the input shaft speed $N_{CO}$ has exceeded the synchronizing speed ($N_{OUT} \times \gamma 2$). In this case, it is preferable to increase the amount of reduction of the input torque with an increase in a difference between the input shaft speed $N_{CO}$ and the synchronizing speed ($N_{OUT} \times \gamma 2$), while taking into account the direction in which the input shaft speed $N_{CO}$ changes with respect to the synchronizing speed ($N_{OUT} \times \gamma 2$). To prevent hunting of the input shaft speed $N_{CO}$, the amount of reduction of the input torque of the automatic transmission 14 may be held constant while the above-indicated difference is larger than a predetermined upper limit.

In the present embodiment wherein the 3-2 downshift of the automatic transmission 14 is initiated while the input shaft speed $N_{CO}$ is lower than the synchronizing speed ($N_{OUT} \times \gamma 2$) of the second-speed position "2nd", the engaging hydraulic pressure $P_{B3}$ of the hydraulic cylinder 52, that is, the engaging force of the brake B3 is controlled so that the input shaft speed $N_{CO}$ is first raised above the synchronizing speed ($N_{OUT} \times \gamma 2$) and is then lowered down at a relatively low rate to approach the synchronizing speed ($N_{OUT} \times \gamma 2$). In this control arrangement, the control for the 1-2 upshift is applicable to the 3-2 downshift while the input shaft speed $N_{CO}$ is higher than the synchronizing speed ($N_{OUT} \times \gamma 2$), so that the 3-2 downshift can be adequately controlled by first releasing the brake b2 in response to the downshift command and then controlling the engaging action of the brake B3.

As described above, the control apparatus according to the present embodiment facilitates the control of the releasing action of the brake B2 and the engaging action of the brake B3 to effect the 3-2 downshift of the automatic transmission 14, as compared with the known control apparatus wherein the hydraulic pressure $P_{B2}$ of the brake B2 is feedback controlled so as to change the input shaft speed $N_{CO}$ at a predetermined rate, while the hydraulic pressure $P_{B3}$ of the brake B3 is held at a relatively low standby level, and when the input shaft speed $N_{CO}$ has approached the synchronizing speed ($N_{OUT} \times \gamma 2$), the brake B2 is released and the brake B3 is fully engaged. Although the hydraulic pressure $P_{B3}$ is held at the standby level for 500 msecs. or more in the known apparatus, it takes only 100 msecs. or so for the piston of the hydraulic cylinder. 52 of the brake B3 to reach the engaging stroke end, in the present embodiment, so that the required downshift time (time required for the transmission 14 to produce the drive force in the second-speed position "2nd") can be considerably reduced.

Further, the rate of increase of the drive force in the second-speed position "2nd" can be adjusted by controlling the rate of increase of the hydraulic pressure $P_{B3}$ in the control phase PH4, so that the input torque of the automatic transmission 14 need not be reduced to achieve the 3-2 downshift without a shifting shock, and without use of a one-way clutch.

In addition, the overshoot engagement of the brake B3 can be always achieved at the predetermined timing in the present embodiment wherein the feed-forward control of the hydraulic pressure $P_{B3}$ of the hydraulic pressure 52 is effected, and the point of time at which the supply of the pressurized fluid to the hydraulic cylinder 52 is initiated is determined by comparing the first time A2 required for the input shaft speed $N_{CO}$ to reach the synchronizing speed ($N_{OUT} \times \gamma 2$) of the second-speed position "2nd", with the second speed B2 required for the piston of the hydraulic cylinder 52 to reach the engaging stroke end. Accordingly, the present embodiment is effective to avoid the 3-2 downshift shock which would take place due to a deviation or variation of the point of time at which the generation of the vehicle drive force in the second-speed position "2nd" is initiated.

Further, the engaging hydraulic pressure $P_{B3}$ of the hydraulic cylinder 52 is controlled to the required minimum level which has been obtained by learning compensation in the 1-2 upshift. This control arrangement is effective to minimize the 3-2 downshift which would take place due to a rapid engagement of the brake B3 with an excessively high pressure so as to deal with a deviation of the point of time at which the input shaft speed $N_{CO}$ has reached the synchronizing speed, and a deviation of the point of time at which the generation of the engaging force of the brake B3 is initiated.

In the 3-2 downshift during coasting of the vehicle indicated in FIG. 18, the point of time at which the supply of the pressurized fluid to the hydraulic cylinder 52 is initiated is determined so as to prevent the generation of the engaging force of the brake B3 before the input shaft speed $N_{CO}$ is lower than the synchronizing speed ($N_{OUT} \times \gamma 2$). This control arrangement is effective to avoid the application of a negative torque to the automatic transmission 14 (namely, the application of the engine braking force to the vehicle) in the process of the 3-2 downshift of the transmission 14 during coasting of the vehicle.

Figure 22:
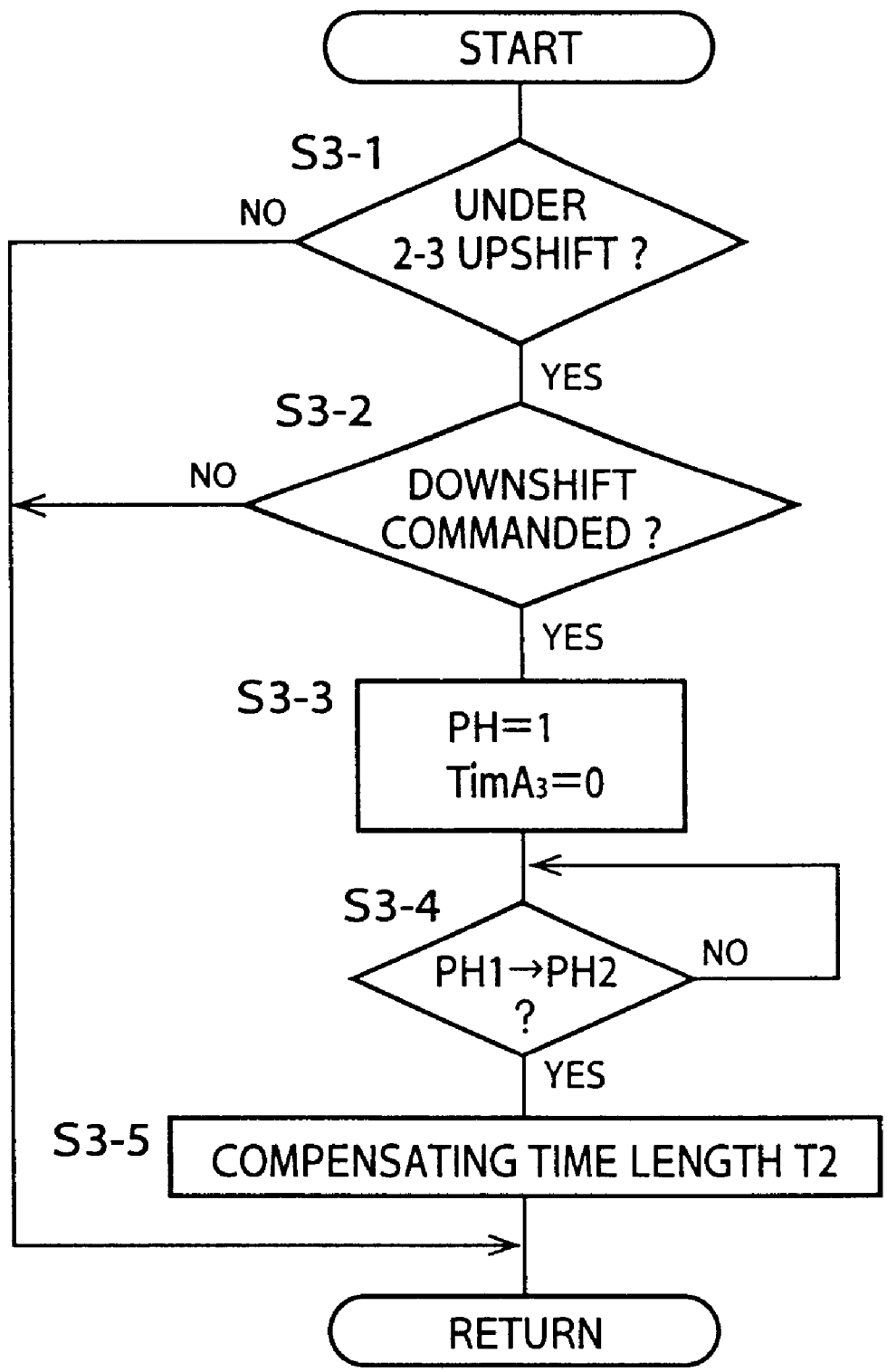
FIG. 22 is a flow chart illustrating a routine executed to control the automatic transmission shown in FIG. 1, when a 3-2 downshift of the automatic transmission is commanded during a 2-3 upshift thereof.
Figure 23:
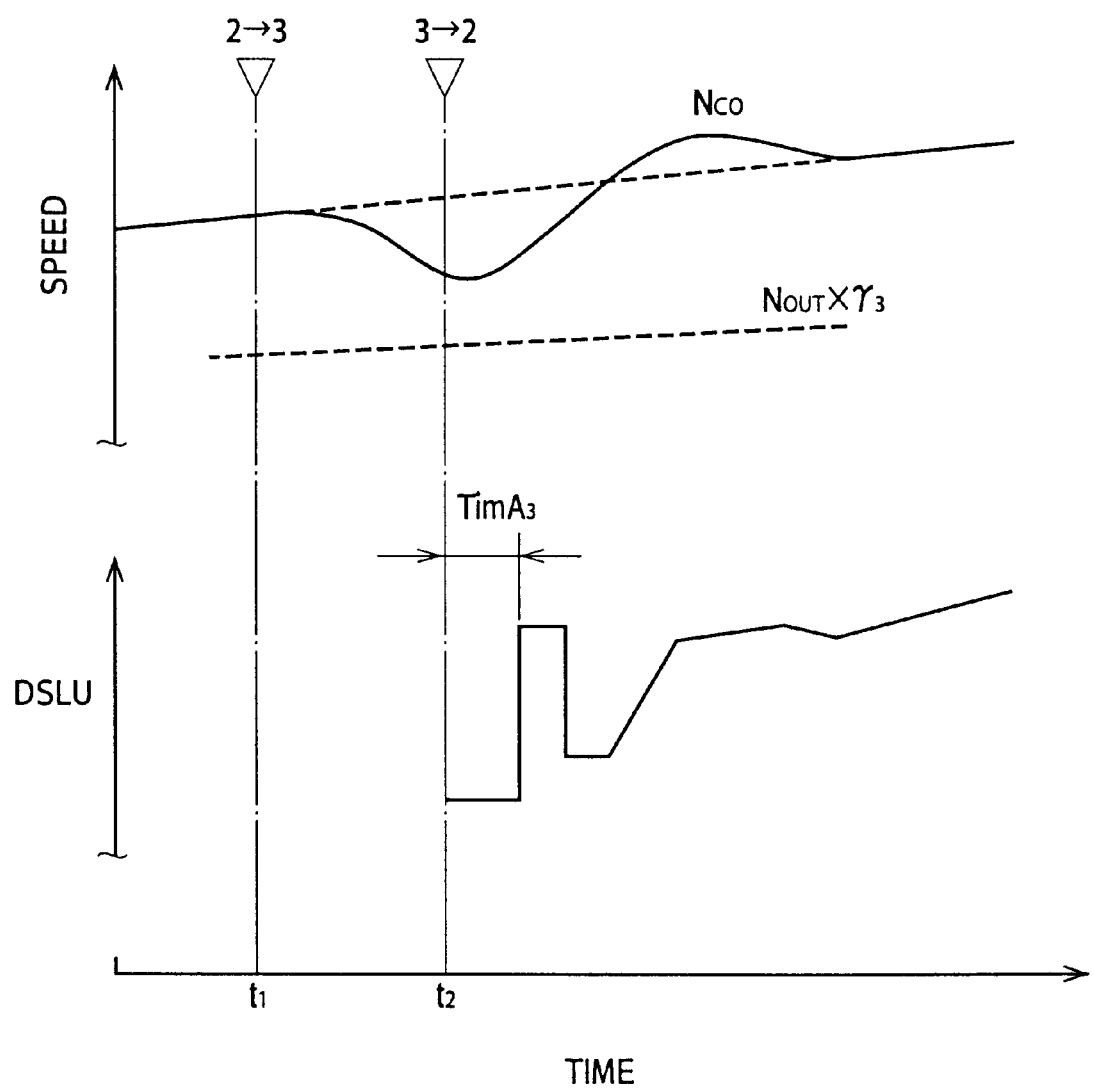
FIG. 23 is a time chart indicating changes of various parameters, by way of example, when the automatic transmission is controlled according to the routine of FIG. 22.

The flow chart of FIG. 22 illustrates a routine executed by the transmission controller 178 in response to a command to effect the 3-2 downshift of the automatic transmission 14, which command is generated due to an operation of the accelerator pedal 150 performed a comparatively short time after the generation of the 2-3 upshift command, that is, before the torque capacity of the brake B2 has been sufficiently increased. The routine of FIG. 22 is repeatedly executed with a predetermined cycle time. The time chart of FIG. 23 shows changes of the input shaft speed $N_{CO}$ and the duty ratio command value DSLU during execution of the routine of FIG. 22. In FIG. 23, "t1" represents point of time at which the 2-3 upshift command is generated, and "t2" represents a point of time at which the 3-2 downshift command is generated.

The routine of FIG. 22 is initiated with step. S3-1 to determine whether the automatic transmission 14 is in the process of the 2-3 upshift. This determination is made on the basis of the operating states of the solenoid-operated valves SL1–SL4, and the actual speed ratio ($N_{CO}/N_{OUT}$) of the automatic transmission. If an affirmative decision (YES) is obtained in step S3-1, the control flow goes to step S3-2 to determine whether the 3-2 downshift command has been generated. When the 3-2 downshift command is generated, the 2-3 shift valve 71 is switched so that the pressurized fluid is supplied to the hydraulic cylinder 52 of the brake B3, while the hydraulic cylinder 54 of the brake B2 is drained, and the control flow goes to step S3-3 to select the control phase PH1 for initiating the overshoot engagement of the brake B3, and reset a timer TimA3 to zero, for measuring a time lapse. With the control phase PH1 selected, the hydraulic cylinder 52 is rapidly drained.

Step S3-3 is followed by step S3-4 to determine whether the control phase PH has changed from PH1 to PH2, as a result of execution of the routine of FIG. 19. If an affirmative decision (YES) is obtained in step S3-4, the control flow goes to step S3-5 to effect learning compensation of the time length T2 depending upon the time lapse measured by the timer TimA3. Described more specifically, the time between the moment at which the supply of the pressurized fluid to the hydraulic cylinder 52 is initiated upon selection of the control phase PH3 and the moment at which the piston of the hydraulic cylinder 52 has reached the engaging stroke end tends to vary with a result of an inadequate control of the engaging action of the brake B3, if the control of the engaging force of the brake B3 by the duty ratio command value DSLU in the control pattern indicated in FIG. 21 is initiated before the hydraulic cylinder 52 has been completely drained. To avoid this inadequate control, the hydraulic cylinder 52 is rapidly drained in the control phase PH1, and the time length T2 is compensated according to a predetermined mathematical equation or data map, such that the time length T2 decreases with a decrease in the time lapse measured by the timer TimA3, where the time length between the moments at which the control phases PH1 and PH2 are selected is shorter than a predetermined threshold, that is, where the draining time of the hydraulic cylinder 52 is not sufficient and the pressurized fluid is more or less left in the hydraulic cylinder 52. Then, the engaging action of the brake B3 is controlled according to the routines of FIGS. 19 and 20, to effect the overshoot engagement of the brake B3 for establishing the second-speed position "2nd" of the automatic transmission 14. It is noted that step S3-5 may be modified to compensate the command value D2 of the duty ratio command value DSLU, rather than or as well as the time length T2, on the basis of the time lapse measured by the timer TimA3.

Thus, the 3-2 downshift of the automatic transmission 14 commanded in response to the operation of the accelerator pedal 150 in the process of the 2-3 upshift can be achieved with a higher degree of control response, in the present arrangement, than in the known arrangement wherein the 3-2 downshift is effected by feedback controlling the hydraulic pressure $P_{B2}$ of the brake B2 after the torque capacity of the brake B2 has been sufficiently increased or after the third-speed position "3rd" has been once established, so that the brake B2 for the third-speed position "3rd" is rapidly released, and the overshoot engagement of the brake B3 for the second-speed position "2nd" is effected.

In the control phase PH1, the hydraulic cylinder 52 is rapidly drained, in order to eliminate an influence of the residual pressure in the hydraulic cylinder 52, so that the overshoot engagement of the brake B3 can be adequately achieved. In particular, the time length T2 or command value D2 is compensated depending upon the draining time measured by the timer TimA3, so as to assure the adequate overshoot control of the brake B3 even where the draining time before the control phase PH3 is selected is relatively short.

It will be understood that a portion of the transmission controller 178 assigned to implement step S3-3 functions as upshift-downshift transition releasing means for first draining the hydraulic cylinder 52 to release the brake B3 upon a transition from the 2-3 upshift to the 3-2 downshift, and then effecting the overshoot engagement of the brake B3. It will also be understood that a portion of the transmission controller 178 assigned to implement step S3-5 functions as overshoot engagement control compensating means for compensating the supply of the pressurized fluid to the hydraulic cylinder 52 depending upon the residual pressure in the hydraulic cylinder 52 at the end of its initial draining, that is, the draining time of the hydraulic cylinder 52 before the above-indicated supply is initiated.

Figure 24:
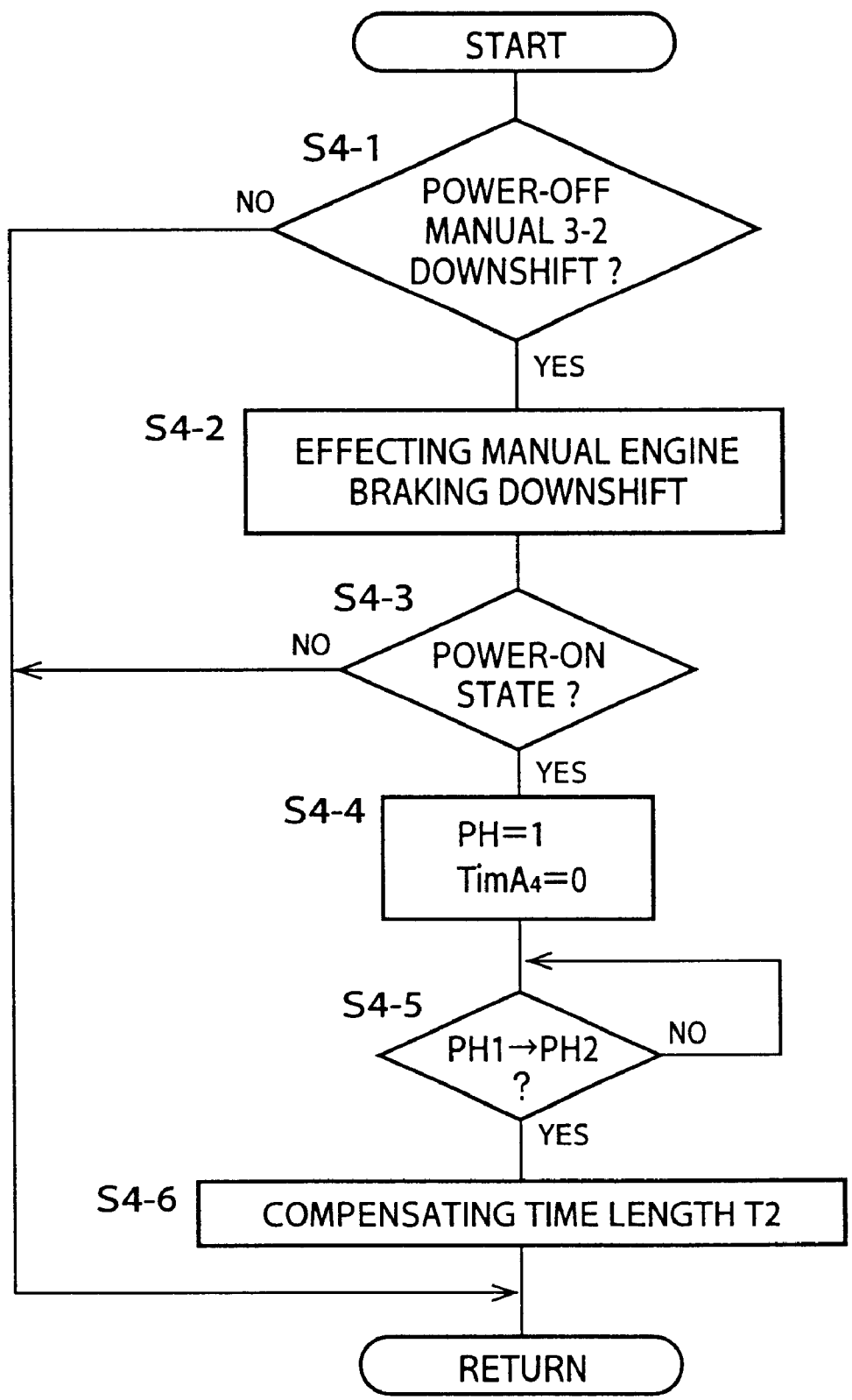
FIG. 24 is a flow chart illustrating a routine for controlling the automatic transmission of FIG. 1 when the vehicle running state is changed to a POWER-ON state during a manual 3-2 downshift of the transmission in a POWER-OFF state of the vehicle.
Figure 25:
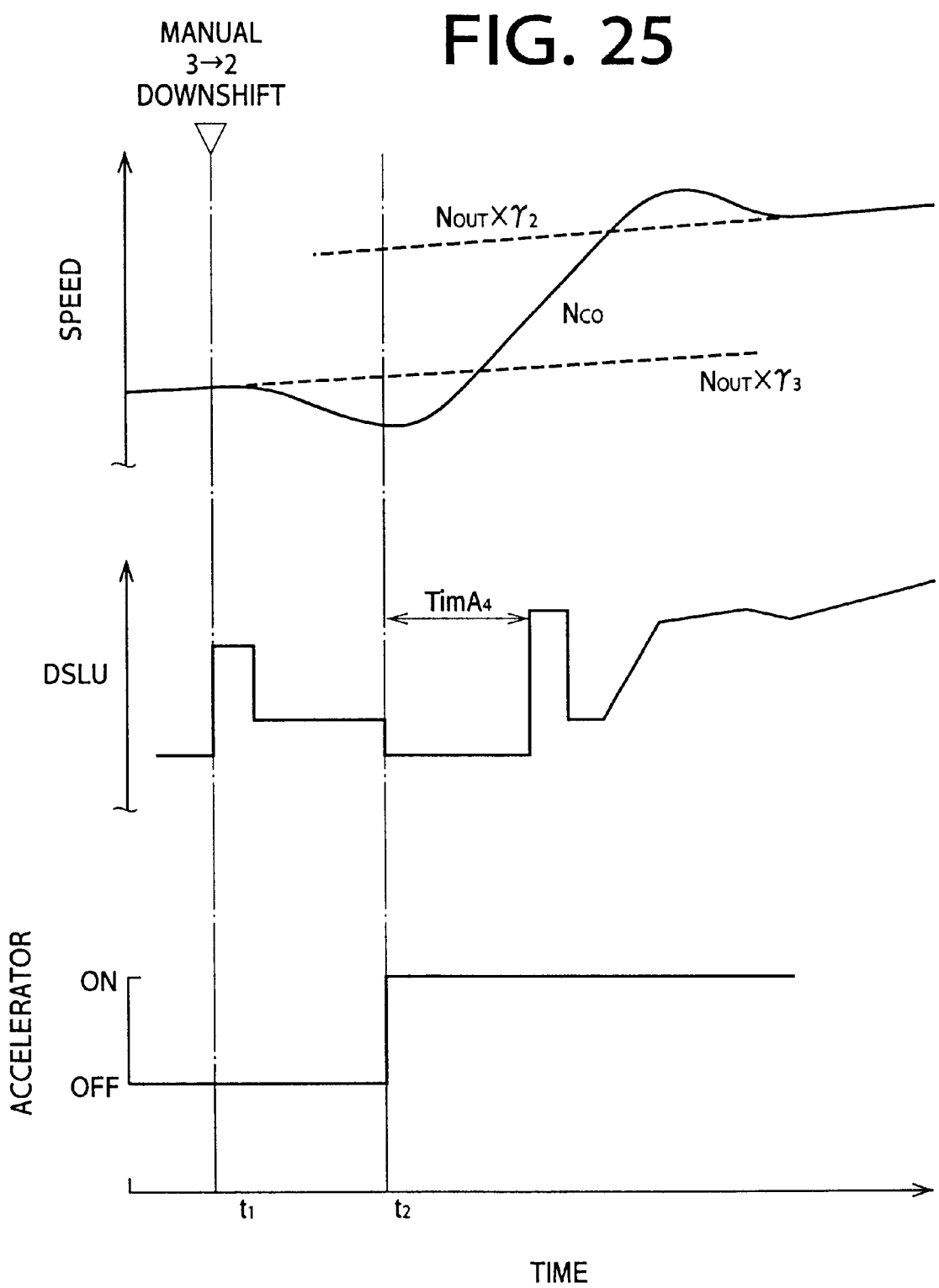
FIG. 25 is a time chart indicating changes of various parameters, by way of example, when the automatic transmission is controlled according to the routine of FIG. 24.

The flow chart of FIG. 24 illustrates a routine 5executed by the transmission controller 178 when the accelerator pedal 150 is depressed in the process of a manual engine braking 3-2 downshift of the automatic transmission 14 in response to a manual operation of the shift lever 172 or downshift switch 186D in the POWER-OFF state with the accelerator pedal 150 placed in the non-operated position. The routine is repeatedly executed with a predetermined cycle time. The time chart of FIG. 25 shows changes of the input shaft speed $N_{CO}$, duty ratio command value DSLU, etc., when the routine of FIG. 24 is executed. In FIG. 25, "t1" represents a point of time at which the 3-2 downshift command is generated, and "t2" represents a point of time at which the accelerator pedal 150 is depressed thereafter.

The routine of FIG. 24 is initiated with step S4-1 to determine whether a 3-2 downshift command to shift down the automatic transmission 14 from the third-speed position "3rd" to the second-speed position "2nd" has been generated as a result of an operation of the shift lever 172 or the downshift switch 186D during running of the vehicle in the POWER-OFF state with the accelerator pedal 150 placed in the non-operated position. In the POWER-OFF state, a drive force is not transmitted from the engine 10 to the drive wheels, but an engine brake is applied to the vehicle. While the POWER-OFF state or the engine braking state can be detected on the basis of the detected input and output speeds of the torque converter 12, it may be detected by determining whether the accelerator pedal 150 is placed in the non-operated position or not. Namely, the vehicle is placed in the POWER-OFF state when the accelerator pedal 150 is placed in the non-operated position. If an affirmative decision (YES) is obtained in step S4-1, the control flow goes to step S4-2 wherein the 2-3 shift valve 71 is switched to supply the pressurized fluid to the hydraulic cylinder 52 of the brake B3 and drain the hydraulic cylinder 54 of the brake B2, and to effect the engine braking downshift control of the hydraulic pressure $P_{B3}$ of the hydraulic cylinder 52. In this engine braking downshift control, the brake B2 is rapidly released while at the same time the engaging force of the brake B3 is controlled so as to smooth increase the engine braking force. Unlike the overshoot engagement control of the brake B3 illustrated in FIGS. 19–21, the engine braking downshift control is formulated to control the duty ratio command value DSLU for fully engaging the brake B3 such that the input shaft speed $N_{CO}$ does not substantially exceed the synchronizing speed ($N_{OUT} \times \gamma 2$).

Step S4-2 is followed by step S4-3 to determine whether the vehicle running state has been turned into the POWER-ON state, that is, whether the accelerator pedal 150 has been depressed in the process of the 3-2 downshift of the automatic transmission 14, namely, before the brake B3 has been fully engaged or before the input shaft speed $NC_{CO}$ has not reached the synchronizing speed ($N_{OUT} \times \gamma 2$). If a negative decision (NO) is obtained in step S4-3, one cycle of execution of the routine of FIG. 24 is terminated. If an affirmative decision (YES) is obtained in step S4-3, the control flow goes to step S4-4 to change the engine braking downshift control to the overshoot engagement control of the brake B3, namely, to select the control phase PH1 for determining the duty ratio command value DSLU, and to reset a timer TimA4 to zero, for measuring a time lapse. In the control phase PH1, the hydraulic cylinder 52 is rapidly drained. Then, the control flow goes to step S4-5 to determine whether the control phase PH has changed from PH1 to PH2. If an affirmative decision (YES) is obtained in step S4-5, the control flow goes to step S4-6 to compensate the time length T2 depending upon the time lapse measured by the timer TimA4. Step S4-6 may be modified to compensate the command value D2 rather than or as well as the time length T2, depending upon the time lapse measured by the timer TimA4. Steps S4-4, S4-5 and S4-6 are substantially identical with steps S3-3, S3-4 and S3-5 of FIG. 22.

As described above, the overshoot engagement of the brake B3 is initiated immediately after the accelerator pedal 150 has been depressed in the process of the engine braking 3-2 downshift of the automatic transmission 14, so that the overshoot encagement of the brake B3 is achieved for establishing the second-speed position "2nd", with an excellent response to the operation of the accelerator pedal 150.

When the engine braking 3-2 downshift control is changed to the overshoot engagement control of the brake B3, the control phase PH1 is purposely selected to rapidly drain the hydraulic cylinder 52, to eliminate an influence of the residual pressure in the drained hydraulic cylinder 52, and to permit the overshoot engagement of the brake B3 to be achieved adequately so that the generation of the engaging force of the brake B3 is initiated only after the input shaft speed $N_{CO}$ has substantially reached or exceeded the synchronizing speed ($N_{OUT} \times \gamma 2$). In particular, the tile length T2 or command value D2 is compensated on the basis of the draining time of the hydraulic cylinder 52 measured by the timer TimA4, so that the overshoot engagement of the brake B3 can be adequately achieved even where the draining time before the phase PH2 is selected is relatively short.

It will be understood that a portion of the transmission controller 178 assigned to implement step S4-2 functions as engine braking shift control means or manual shifting engagement control means for controlling the hydraulic pressure of the brake B3 in a manner different from that of the overshoot engagement control device described above, for shifting down the automatic transmission 14 to the second-speed position "2nd" in response to a manual operation to shift down the transmission 14 while the vehicle is running in the POWER-OFF state. It will also be understood that a portion of the transmission controller 178 assigned to implement step S4-4 functions as transition releasing means operated in response to an operation of an accelerating member for accelerating the vehicle, in the process of the manual engine braking 3-2 downshift, for first draining the hydraulic cylinder 52 to release the brake B3 and then enabling the overshoot engagement control device to operate to control the engaging force of the brake B3. It will further be understood that a portion of the transmission controller 178 assigned to implement step S4-6 functions as overshoot engagement control compensating means for compensating the supply of the pressurized fluid to the brake B3, depending upon the residual pressure in the hydraulic cylinder 52 when the draining of the hydraulic cylinder 52 is incomplete due to an insufficient draining time of the hydraulic cylinder 52.

Figure 26:
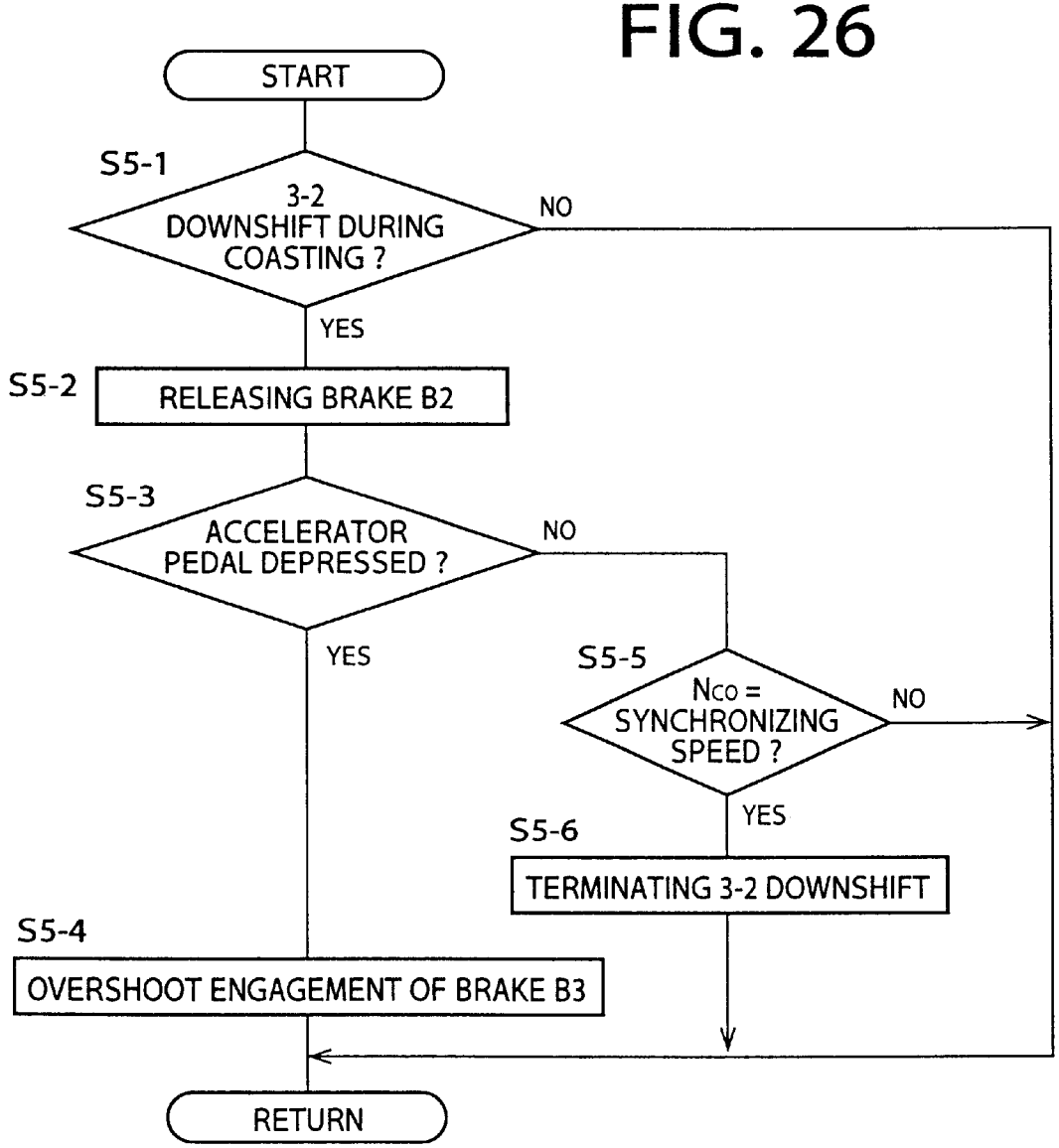
FIG. 26 is a flow chart illustrating a routine for controlling a 3-2 downshift of the automatic transmission of FIG. 1 during coasting of the vehicle, such that the brake B3 is held in the released state while the accelerator pedal is off.
Figure 27:
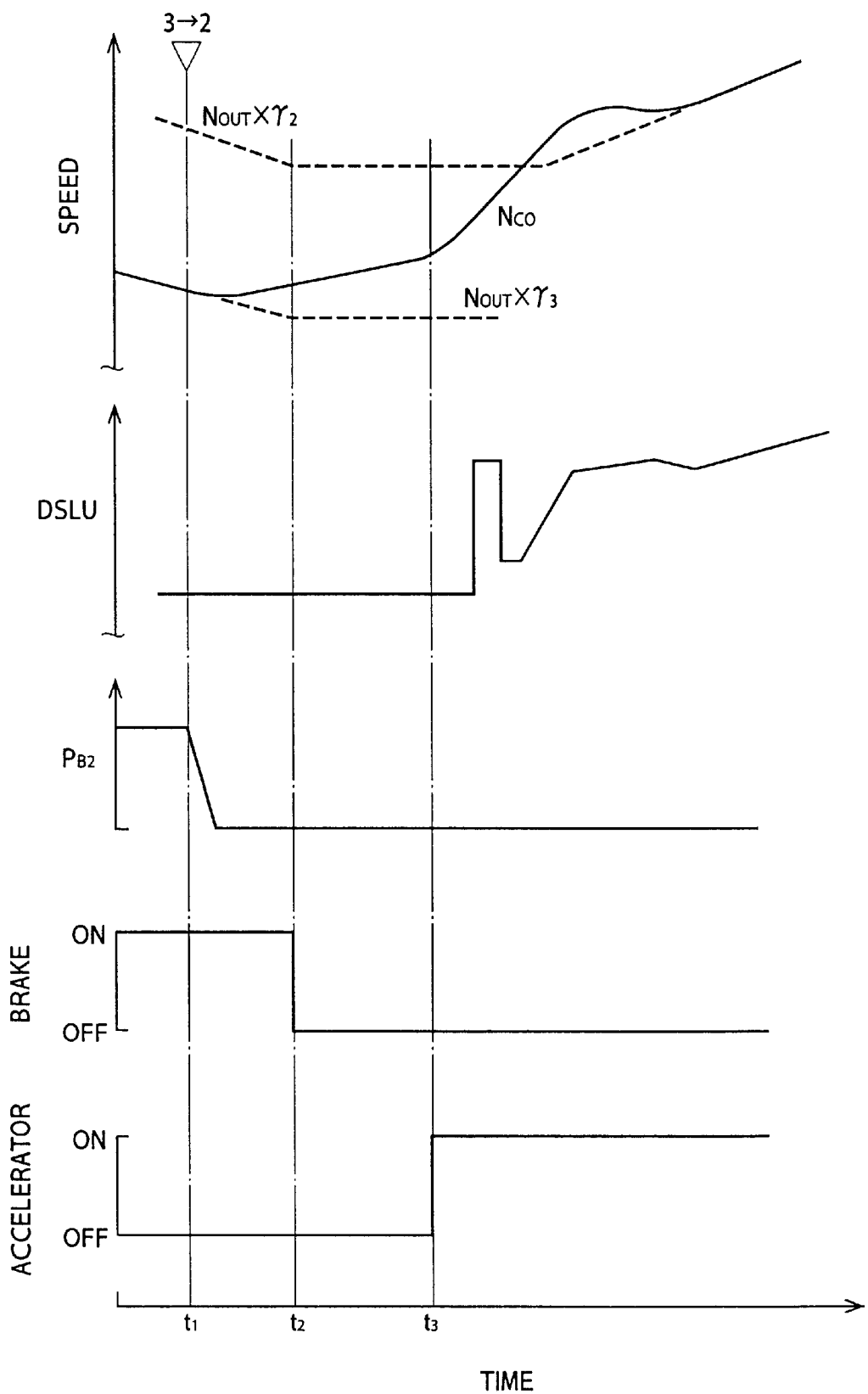
FIG. 27 is a time chart indicating changes of various parameters, by way of example, when the automatic transmission is controlled according to the routine of FIG. 26.

The flow chart of FIG. 26 illustrates a routine executed by the transmission controller 178 to effect the overshoot engagement of the brake B3 when the accelerator pedal 150 is operated in the process of the 3-2 downshift of the automatic transmission 14 during coasting of the vehicle with the accelerator pedal 150 placed in the non-operated position and with a braking system activated. The routine is repeated executed with a predetermined cycle time. The time chart of FIG. 27 shows changes of the input shaft speed $N_{CO}$, duty ratio command value DSLU, etc. when the routine of FIG. 26 is executed. In FIG. 27, "t1" represents a point of time at which a command to effect the 3-2 downshift during vehicle coasting is generated, "t2" represents a point of time at which braking system is turned off, while "t3" represents a point of time at which the accelerator pedal 150 is operated.

The routine of FIG. 26 is initiated with step S5-1 to determine whether the automatic transmission 14 is in the process of the 3-2 downshift of the automatic transmission 14, which is initiated according to the 3-2 downshift boundary line indicated in FIG. 8, as a result of a reduction in the running speed V of the vehicle while the vehicle is coasting with the accelerator pedal 150 placed in the non-operated position or with the brake pedal placed in an operated position. This determination as to whether the automatic transmission 14 is in the coasting 3-2 downshift is made by determining whether the throttle valve 156 is fully closed, or whether the idling detector switch of the throttle sensor 164 is in the ON state. If an affirmative decision (YES) is obtained in step S5-1, the control flow goes to step S5-2 to switch the 2-3 shift valve 71 for controlling the hydraulic pressure $P_{B3}$ of the hydraulic cylinder 52 of the brake B3 and draining the hydraulic cylinder 54 to rapidly release the brake B2. Initially, the hydraulic pressure $P_{B3}$ is controlled by the duty ratio command value DSLU of the linear solenoid valve SLU in the control phase PH1 so that the brake B3 is held in the released state, as indicated in FIG. 27.

Step S5-2 is followed by step S5-3 to determine whether the accelerator pedal 150 has been depressed. If an affirmative decision (YES) is obtained in step S5-3, the control flow goes to step S5-4 to effect the overshoot engagement of the brake B3 as indicated in FIGS. 19–21, so that the automatic transmission 14 is rapidly shifted down to the second-speed position "2nd". The time chart of FIG. 26 shows the case in which the accelerator pedal 150 is operated in the 3-2 downshift during vehicle coasting. The input shaft speed $N_{CO}$ is raised as a result of the releasing of the brake B2, as indicated in FIG. 27, since the engine speed $N_E$ is higher than the input shaft speed $N_{CO}$ upon generation of the 3-2 downshift command, so that a small drive force is transmitted to the drive wheels through the transmission 14 placed in the third-speed position "3rd", in the initial portion of the 3-2 downshift. It will be understood that a portion of the transmission controller 178 assigned to implement step S504 functions as the overshoot engagement control device.

If a negative decision (NO) is obtained in step S5-3, that is, when the accelerator pedal 150 remains in the non-operated position, the control flow goes to step S5-5 to determine whether the input shaft speed $N_{CO}$ has been raised to the synchronizing ($N_{OUT} \times \gamma 2$). While the input shaft speed $N_{CO}$ is lower than the synchronizing speed, a negative decision (NO) is obtained in step S5-5, and one cycle of execution of the routine of FIG. 26 is terminated. If the input shaft speed $N_{CO}$ has been raised to or above the synchronizing speed ($N_{OUT} \times \gamma 2$), the control flow goes to step S5-6 to terminate the coasting 3-2 downshift with the brake B3 held in the released state. Then, the control flow goes to a routine illustrated in the flow chart of FIG. 28, for example, to control the engaging and releasing actions of the brake B3 during running of the vehicle with the automatic transmission 14 placed in the second-speed position "2nd". Step S5-6 may be modified to engage the brake B3.

In the present arrangement wherein the brake B3 is held in the released state in the process of the coasting 3-2 downshift to the second-speed position "2nd", the overshoot engagement of the brake B3 is effected in step S5-4 when the accelerator pedal 150 is operated in the process of the coasting 3-2 downshift. Accordingly, a drive force can be rapidly transmitted through the automatic transmission 14 to the drive wheels, while preventing a negative torque to be transmitted to from the drive wheels to the engine 10 in the coasting 3-2 downshift.

Figure 28:
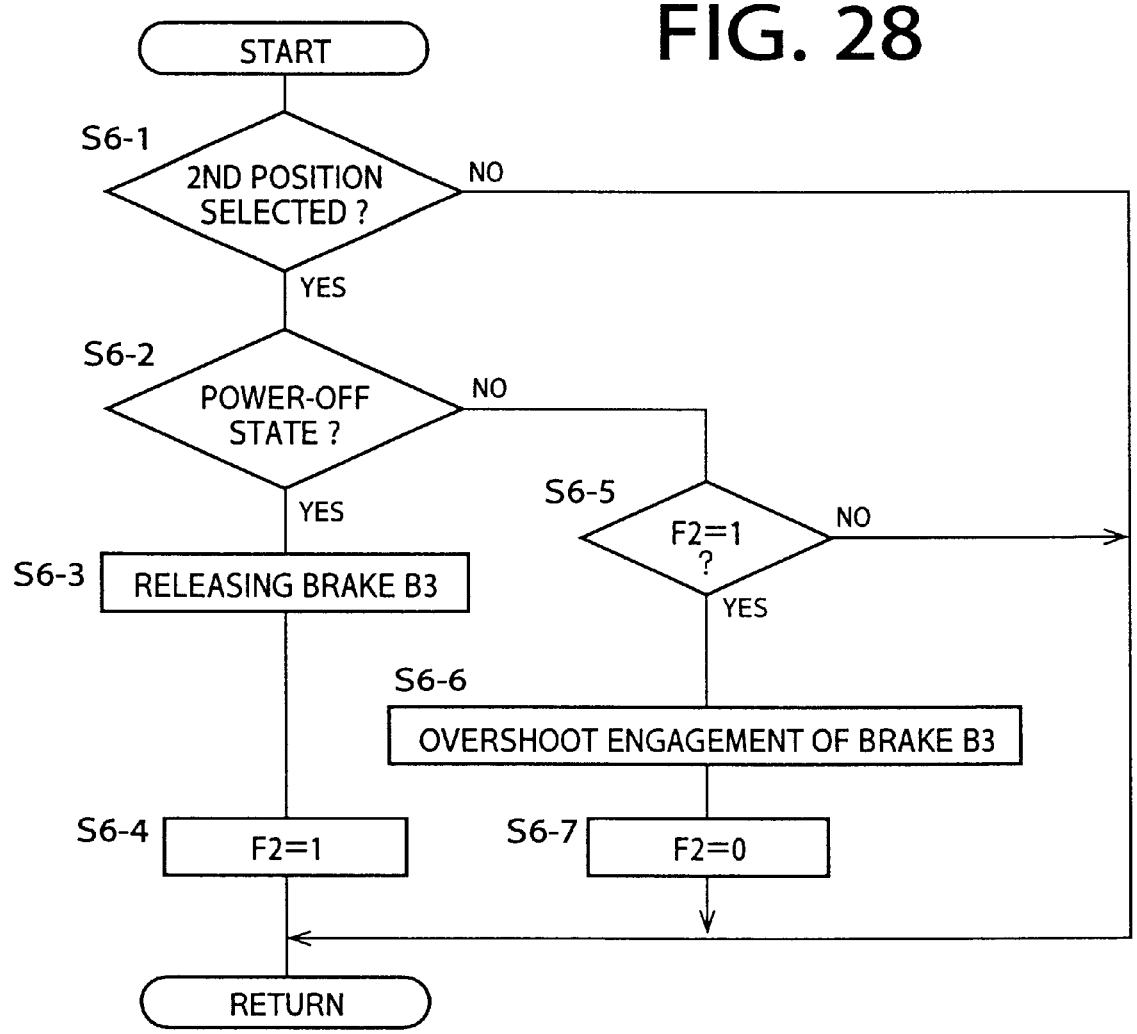
FIG. 28 is a flow chart illustrating a routine for engaging and releasing the brake B3 during running of the vehicle with the automatic transmission placed in the second-speed position, depending upon the vehicle is placed in the POWER-OFF state or not.

The flow chart of FIG. 28 illustrates a routine executed by the transmission controller 178 for controlling the releasing and engaging actions of the brake B3 during running of the vehicle with the automatic transmission 14 placed in the second-speed position "2nd", depending upon whether the vehicle is in the POWER-OFF state or not. The routine of FIG. 28 is repeatedly executed with a predetermined cycle time. The time chart of FIG. 29 shows changes of the input shaft speed $N_{CO}$, the duty ratio command value DSLU, etc., when the vehicle is temporarily placed in the POWER-OFF state (with the accelerator pedal 150 being released) during running of the vehicle with the automatic transmission 14 placed in the second-speed position "2nd". In FIG. 29, "t1" represents a point of time at which the accelerator pedal 150 is depressed, and "t2" represents a point of time at which the brake B3 is substantially fully released, while "t3" represents a point of time at which the supply of the pressurized fluid to the hydraulic cylinder 52 is initiated to effect the overshoot engagement of the brake B3, that is, a point of time at which the control phase PH2 is selected. Further, "t4" represents a point of time at which the brake B3 is substantially fully engaged.

The routine of FIG. 28 is initiated with step S6-1 to determine whether the vehicle is running with the automatic transmission 14 placed in the second-speed position "2nd". This determination is made on the basis of the presently selected position of the shift lever 172 and the operating states of the solenoid-operated valves SL1–SL4. In the present embodiment, the transmission controller 178 determines that the second-speed position "2nd" is presently established, even where the brake B3 is released with the linear solenoid valve SLU in step S6-2 which will be described. If an affirmative decision (YES) is obtained in step S6-1, the control flow goes to step S6-2 to determine whether the vehicle is in the POWER-OFF state in which a drive force is not transmitted from the engine 10 to the drive wheels, namely, in which an engine brake is applied to the vehicle. The POWER-OFF state of the vehicle can be detected on the basis of the input and output speeds of the torque converter 12, or by determining whether the accelerator pedal 150 is in the non-operated position or not.

If an affirmative decision (YES) is obtained in step S6-2, the control flow goes to step S6-3 in which the brake B3 is released by the linear solenoid valve SLU, and then goes to step S6-4 in which a flag F2 is set to "1". To release the brake B3, the hydraulic pressure $P_{B3}$ is desirably controlled to fully release the brake B3 immediately before a point of time at which a negative torque or engine braking torque is expected to be generated. It will be understood that a portion of the transmission controller 178 assigned to implement step S6-3 functions as POWER-OFF releasing means for releasing the brake B3 when the vehicle is placed in the POWER-OFF state during running of the vehicle with the automatic transmission 14 placed in the second-speed position "2nd".

If a negative decision (NO) is obtained in step S6-2, the control flow goes to step S6-5 to determine whether the flag F2 is set at "1", that is, whether the brake B3 has been held in its released state with the vehicle held in the POWER-OFF state. If a negative decision (NO) is obtained in step S6-5, one cycle of execution of the routine of FIG. 28 is terminated. If an affirmative decision (YES) is obtained in step S6-5, the control flow goes to step S6-6 to effect the overshoot engagement of the brake B3 as illustrated in FIGS. 19–21, so that the brake B3 is rapidly engaged. Step S6-6 is followed by step S6-7 to reset the flag F2 to "0". Regarding the overshoot engagement control of the brake B3 in step S6-6, it is desirable to release the brake B3 prior to the overshoot engagement control, as described above by reference to the flow charts of FIGS. 22 and 24, in view of a possibility that the brake B3 has not been fully released, and also desirable to compensate the time length T2 and the command value D1 as in steps S3-5 and S4-6 of FIGS. 22 and 24. It will be understood that a portion of the transmission controller 178 assigned to implement step S6-6 functions as the overshoot engagement control device.

According to the routine of FIG. 28, the brake B3 is released in step S603 when the vehicle is placed in the POWER-OFF state during running of the vehicle with the automatic transmission 14 placed in the second-speed position "2nd". This arrangement prevents generation of a negative torque when the vehicle is placed in the POWER-OFF state, like the arrangement wherein one-way clutch is used for the same purpose. Further, when the accelerator pedal 150 is depressed while the brake B3 is in the released state, the overshoot engagement of the brake B3 is effected in step S6-6 in step S6-6, so that a vehicle drive force can be rapidly produced in response to the operation of the accelerator pedal 150. Thus, by controlling the releasing and engaging actions of the brake B3, the same advantage as provided by the use of the one-way clutch is provided in the present arrangement. Rather, the vehicle drive force can be more smoothly produced by the overshoot engagement of the brake B3 than in the case where the one-way clutch is used.

While the presently preferred embodiment of the invention has been described above in detail by reference to the accompanying drawings, for illustrative purpose only, it is to be understood that the invention may be embodied with various changes and improvements, which may occur to those skilled in the art. Although there have been described the various examples of control of 3-2 downshifts and other, shifting actions to establish the second-speed position "2nd" of the automatic transmission 14, the principle of the present invention is applicable to other shifting actions including upshifts of the automatic transmission 14, depending upon the arrangemnent of the automatic transmission.

What is claimed is:

1. An apparatus for controlling an automatic transmission of an automotive vehicle, which is shifted to a selected one of a plurality of operating positions by an engaging action of a frictional coupling device, said apparatus comprising:

an overshoot engagement control device which is operated to shift said automatic transmission to said selected one operating position such that a shifting action of said automatic transmission is initiated while an input speed of said automatic transmission is lower than a synchronizing speed of said selected one operating position, said overshoot engagement control device controlling an engaging force of said frictional coupling device such that said input speed is first raised above said synchronizing speed and is then lowered down toward said synchronizing speed.

2. An apparatus according to claim 1, wherein said automatic transmission includes a hydraulic cylinder operated to effect said engaging action of said frictional coupling device, said apparatus further comprising:

a pressure regulating device for controlling a hydraulic pressure of said hydraulic cylinder, and wherein said overshoot engagement control device controls said pressure regulating device, to effect a feed-forward control of said hydraulic pressure of said hydraulic cylinder, said overshoot engagement control device including:

time calculating means for calculating a first time required for said input speed of said automatic transmission to reach said synchronizing speed of said selected one operating position;

a time data memory device which stores a second time required for a piston of said hydraulic cylinder to reach an engaging stroke end thereof; and timing determining means for comparing said first time with said second time, and thereby determining a point of time at which a supply of a pressurized fluid to said hydraulic cylinder is initiated, such that said piston has reached said engaging stroke end to initiate the generation of said engaging force of said frictional coupling device, when said input speed of said automatic transmission has substantially reached or exceeded said synchronizing speed.

3. An apparatus according to claim 2, wherein said time calculating means detects a rate of change of said input speed, obtains said synchronizing speed on the basis of a speed ratio of said selected one operating position and an output speed of said automatic transmission, and calculates said first time by dividing a difference between the obtained synchronizing speed and said input speed by said rate of change of said input speed.

4. An apparatus according to claim 1, wherein said automatic transmission includes a hydraulic cylinder operated to effect said engaging action of said frictional coupling device, said apparatus further comprising:

manual shifting engagement control means operated in response to a manual operation to effect a manual downshift of said automatic transmission to said selected one operating position while the vehicle is running in a power-off state in which a drive force is not transmitted through said automatic transmission to drive wheels of the vehicle, said manual shifting engagement control means controlling a hydraulic pressure of said hydraulic cylinder in a manner different from that of said overshoot engagement control device; and transition releasing means operated in response to an increase in an amount of operation of an accelerating member for accelerating the vehicle, in the process of said manual downshift of said automatic transmission, for first draining said hydraulic cylinder to release said frictional coupling device, and then enabling said overshoot engagement control device to operate to control said engaging force of said selected one frictional coupling device.

5. An apparatus according to claim 4, wherein said manual shifting engagement control means includes means for determining that the vehicle is placed in said power-off state, when said accelerating member is placed in a non-operated position thereof.

6. An apparatus according to claim 1, wherein said overshoot engagement control device controls said engaging force of said frictional coupling device when said automatic transmission is commanded to be shifted down to said selected one operating position during coasting of the vehicle while an accelerating member for accelerating the vehicle is placed in a non-operated position, such that said input speed is first raised above said synchronizing speed and is then lowered down toward said synchronizing speed, and such that said engaging force is not generated by said frictional coupling device while said input speed is not higher than said synchronizing speed.

7. An apparatus according to claim 1, further comprising means for holding said frictional coupling device in its released state while an accelerating member for accelerating the vehicle is placed in a non-operated position in the process of a downshift of said automatic transmission to said selected one operating position during coasting of the vehicle, and wherein said overshoot engagement control device is operated, when said accelerating member is operated, to control said engaging force of said frictional coupling device such that said input speed is first raised above said synchronizing speed and is then lowered down to said synchronizing speed.

8. An apparatus according to claim 1 further comprising power-off releasing means for releasing said frictional coupling device when the vehicle is brought into a power-off state in which a drive force is not transmitted through the automatic transmission to drive wheels of the vehicle, during running of the vehicle while said automatic transmission is placed in said selected one operating position with said frictional coupling device placed in an engaged state thereof, and wherein said overshoot engagement control device is operated in response to an increase in an amount of operation of said accelerating member while said frictional coupling device is held in a released state thereof by said power-off releasing means, to control said engaging force of said frictional coupling device such that said input speed is first raised above said synchronizing speed and is then lowered down to said synchronizing speed.

9. An apparatus according to claim 8, wherein said power-off releasing means includes means for determining that the vehicle is brought into in said power-off state when said accelerating member which has been operated is released to a non-operated position thereof.

10. An apparatus according to claim 1, wherein said automatic transmission includes a plurality of rotary elements, and a first brake and a second brake for fixing respective ones of said rotary elements to a stationary housing of said automatic transmission, said selected one operating position of said automatic transmission is a third-speed position, and said shifting action is a 3-2 downshift of said automatic transmission from a third-speed position to said second-speed position, which 3-2 downshift is achieved by engaging said first brake as said frictional coupling device and at the same time releasing said second brake as another frictional coupling device.

\* \* \* \* \*